US012162231B2

(12) United States Patent
Guillot et al.

(10) Patent No.: US 12,162,231 B2
(45) Date of Patent: Dec. 10, 2024

(54) OPTICAL ARTICLES COMPRISING ENCAPSULATED MICROLENSES AND METHODS OF MAKING THE SAME

(71) Applicant: Essilor International, Charenton-le-pont (FR)

(72) Inventors: Matthieu Guillot, Charenton-le-pont (FR); Mathieu Meynen, Charenton-le-pont (FR); Hao-Wen Chiu, Charenton-le-pont (FR); Christophe Plessis, Charenton-le-pont (FR); Jeanne Marchal, Charenton-le-pont (FR); Bjorn Drobe, Singapore (SG)

(73) Assignee: Essilor International, Charenton-le-pont (FR)

( * ) Notice: Subject to any disclaimer, the term of this patent is extended or adjusted under 35 U.S.C. 154(b) by 0 days.

(21) Appl. No.: 18/451,336

(22) Filed: Aug. 17, 2023

(65) Prior Publication Data

US 2023/0391028 A1    Dec. 7, 2023

Related U.S. Application Data

(63) Continuation of application No. 18/049,856, filed on Oct. 26, 2022, now Pat. No. 11,772,340, which is a
(Continued)

(30) Foreign Application Priority Data

Oct. 17, 2018   (EP) ..................................... 18306364

(51) Int. Cl.
*B29D 11/00* (2006.01)
*G02B 1/11* (2015.01)
(Continued)

(52) U.S. Cl.
CPC .......... *B29D 11/00028* (2013.01); *G02B 1/11* (2013.01); *G02B 1/14* (2015.01); *G02B 3/0031* (2013.01)

(58) Field of Classification Search
None
See application file for complete search history.

(56) References Cited

U.S. PATENT DOCUMENTS 6,104,536 A   8/2000  Eckhardt
11,772,340 B2 * 10/2023  Guillot ............ B29D 11/00317
                                                       351/159.01
(Continued)

FOREIGN PATENT DOCUMENTS

EP       3273292 A1    1/2018
WO   2018/076057 A1    5/2018
WO   2020/078693 A1    4/2020

OTHER PUBLICATIONS

International Search Report and Written Opinion issued in International Application No. PCT/EP2019/076176 mailed on Dec. 2, 2019.
(Continued)

*Primary Examiner* — Robert E. Tallman
(74) *Attorney, Agent, or Firm* — Oblon, McClelland, Maier & Neustadt, L.L.P.

(57) ABSTRACT

The present disclosure includes optical articles comprising a lens having first and second lens surfaces and a protective layer having first and second protective surfaces that is coupled to the lens such that the first protective surface is disposed on the second lens surface. The optical article can comprise a plurality of convex or concave optical elements defined on the second lens surface or the first protective surface. The protective layer can have a maximum thickness larger than a maximum height of each of the optical ele-
(Continued)

ments such that the protective layer encapsulates the optical elements.

20 Claims, 17 Drawing Sheets

Related U.S. Application Data continuation of application No. 17/286,259, filed as application No. PCT/EP2019/076172 on Sep. 27, 2019.

(51) Int. Cl.
*G02B 1/14* (2015.01)
*G02B 3/00* (2006.01)

(56) References Cited

U.S. PATENT DOCUMENTS

| | | |
|---|---|---|
| 2015/0309332 A1 | 10/2015 | Hillenbrand et al. |
| 2016/0091737 A1 | 3/2016 | Kim et al. |
| 2016/0306192 A1 | 10/2016 | Marshall et al. |
| 2017/0184875 A1 | 6/2017 | Newman |
| 2020/0409173 A1 | 12/2020 | Mappes et al. |

OTHER PUBLICATIONS

International Search Report and Written Opinion issued in International Application No. PCT/EP2019/076172 mailed on Dec. 2, 2019.

* cited by examiner

OPTICAL ARTICLES COMPRISING ENCAPSULATED MICROLENSES AND METHODS OF MAKING THE SAME

CROSS-REFERENCE TO RELATED APPLICATIONS

This application is a continuation of and claims priority to U.S. application Ser. No. 18/049,856, filed Oct. 26, 2022, which is a continuation of and claims priority to U.S. application Ser. No. 17/286,259, filed Apr. 16, 2021, which is a national phase application under 35 U.S.C. § 371 of International Application No. PCT/EP2019/076172, filed Sep. 27, 2019, which claims priority to European Patent Application No. 18306364.3 filed Oct. 17, 2018. The entire contents of each of the above-referenced disclosures is specifically incorporated by reference herein without disclaimer.

FIELD OF INVENTION

The present invention relates generally to optical articles and, more particularly but without limitation, to optical articles comprising encapsulated optical elements.

BACKGROUND

Optical articles, such as lenses, can be used to correct refractive errors of the eye, such as, for example, myopia, hyperopia, presbyopia, and astigmatism. Some lenses include optical elements such as microlenses on the lens surface which can facilitate correction of these refractive errors. For example, microlenses can provide a positive addition value to focus part of the incoming light in front of the retina and thereby control myopia evolution.

Microlenses are used in other applications as well. For example, microlenses are used in digital projectors, imaging devices, e.g., photocopiers and mobile-phone cameras, microscopes, e.g., for uniform illumination, displays, and for improving light collection efficiency of CCD arrays, among other applications.

Optical elements disposed on an outer lens surface may have limited protection and thus can be susceptible to damage. Some lenses include a coating, such as a hard coat or varnish, on the optical elements. These coatings, however, may not provide adequate protection. Additionally, these conventional coatings can change the geometric shape and thus the optical design of the optical elements. As a result, the optical elements may no longer provide the optical target they were designed to meet. Accordingly, there is a need in the art for optical articles configured to provide adequate optical element protection without altering the optical design thereof.

SUMMARY

The present optical articles address the need for improved optical element protection by providing a protective layer that fully encapsulates optical elements, e.g., microlenses, of the optical article. An optical article according to the invention is defined in claim 1. The protective layer can have a maximum thickness that is greater than a maximum height of each of the optical elements to achieve full encapsulation thereof, e.g., such that an outer surface of the optical article does not reproduce the optical element shape. The protective layer can thereby protect the optical elements with minimal, if any, alteration to the optical design of the optical elements. Various protective layers are suitable for use in the present optical articles, including, for example, wafers, coatings, lenses, and glue.

Some of the present optical articles comprise a lens having opposing first and second lens surfaces and a protective layer having opposing first and second protective surfaces. The protective layer, in some articles, is coupled to the lens such that the first protective surface is disposed on the second lens surface. Some articles comprise a plurality of convex or concave optical elements, e.g., microlenses. In some articles, each of the optical elements defines a portion of the second lens surface, optionally when the lens comprises the optical elements. In some articles, each of the optical elements defines a portion of the first protective surface, optionally when the protective layer comprises the optical elements.

Each of the optical elements, in some articles, has a maximum height, optionally measured in a direction perpendicular to the first protective surface, that is less than or equal to 0.1 millimeters (mm). In some articles, each of the optical elements can have a diameter that is less than or equal to 2.0 mm. The protective layer, in some articles, has a maximum thickness, optionally measured in a direction perpendicular to the first protective surface between the first and second protective surfaces, that is larger than the maximum height of each of the optical elements. In some articles, the optical elements are encapsulated within a volume defined between the second protective surface and the first lens surface. Other embodiments of the optical article according to the invention are defined in claims 2-8.

Some of the present methods comprise moving first and second primary mold portions of a first mold from an open position to a closed position in which the primary mold portions cooperate to define a first mold cavity, where each of the primary mold portions defines a molding surface. A method of forming an optical article according to the invention is defined in claim 9. Some methods comprise introducing a first moldable material into the first mold cavity and, optionally, setting the first moldable material to form a first optical member having opposing first and second optical surfaces. In some methods, the molding surface of the second primary mold portion defines a plurality of concave recesses or a plurality of convex protrusions such that the second optical surface defines a plurality of optical elements. In some methods, each of the optical elements is convex, optionally when the second primary mold portion defines a plurality of concave recesses. In some methods, each of the optical elements is concave, optionally when the second primary mold portions defines a plurality of convex protrusions. Each of the optical elements, in some methods, has a maximum height, optionally measured in a direction perpendicular to the second optical surface, that is less than or equal to 0.1 mm. Each of the optical elements, in some methods, has a diameter that is less than or equal to 2.0 mm.

Some methods comprise coupling a second optical member to the second optical surface. In some methods, the second optical member has a maximum thickness, optionally measured in a direction perpendicular to the second optical surface between first and second surfaces of the second optical member, that is larger than the maximum height of each of the optical elements. In some methods, the optical elements are encapsulated within a volume defined between the second surface of the second optical member and the first optical surface. Other embodiments of the method of forming an optical article according to the invention are defined in claims 10-15.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments. Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale, unless otherwise noted, meaning the sizes of the depicted elements are accurate relative to each other for at least the embodiment in the view.

DETAILED DESCRIPTION OF ILLUSTRATIVE EMBODIMENTS

Figure 1A:
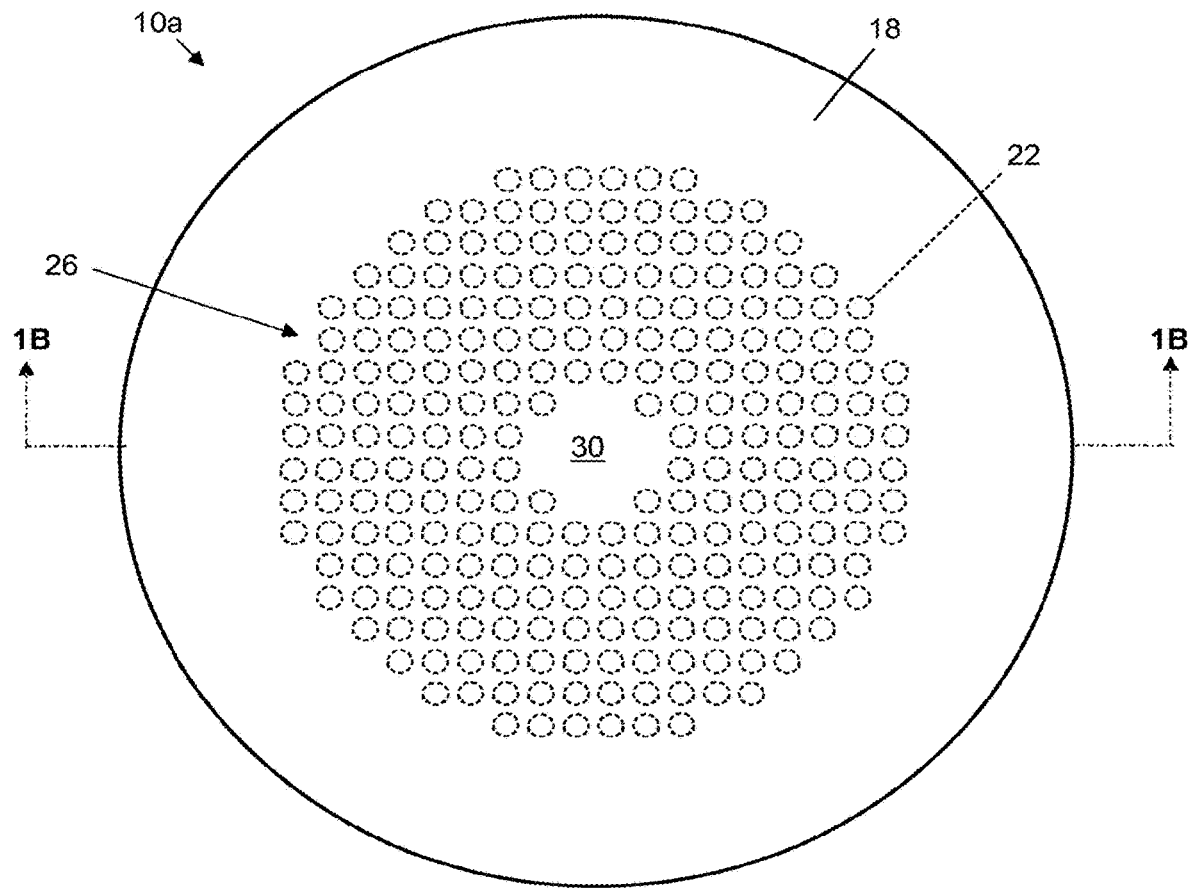
FIG. 1A is a top view of a first embodiment of the present optical articles that comprises a lens having a plurality of optical elements and a protective layer encapsulating the optical elements.
Figure 1B:
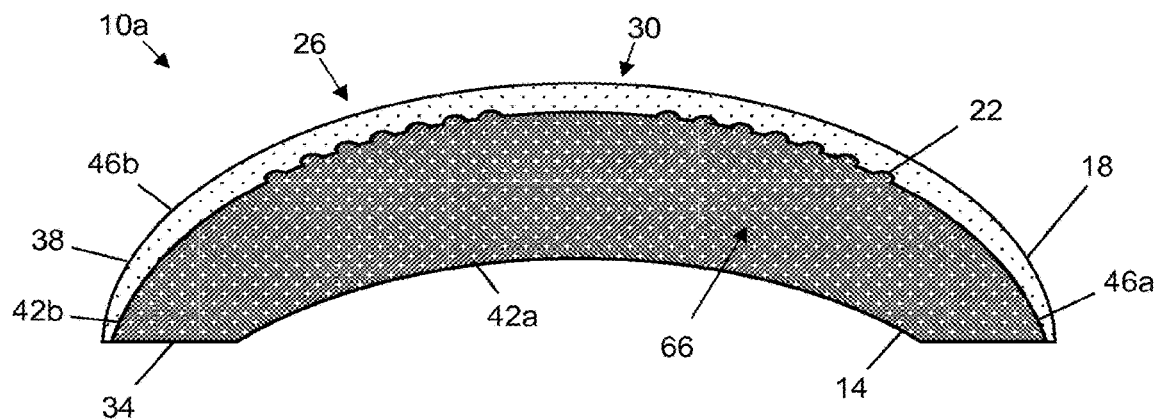
FIG. 1B is a sectional view of the optical article of FIG. 1A taken along line 1B-1B.
Figure 1C:
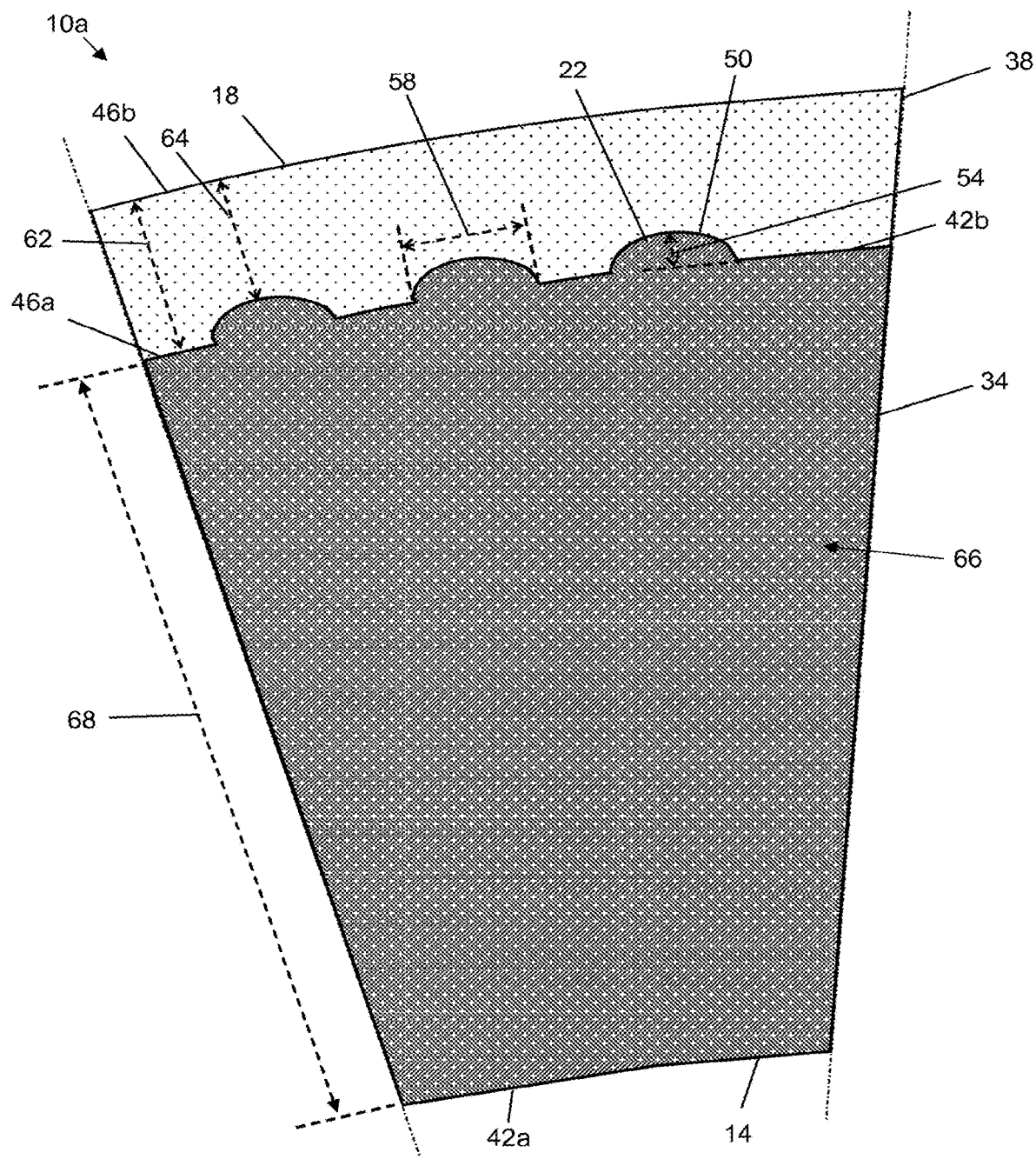
FIG. 1C is an enlarged, partial sectional view of the optical article of FIG. 1A.

Referring to FIGS. 1A-1C, shown is a first embodiment 10a of the present optical articles. Optical article 10a can comprise a lens 34 having opposing first and second lens surfaces 42a and 42b and a protective layer 38 that has opposing first and second protective surfaces 46a and 46b. Protective layer 38 can comprise, for example, a wafer. Optical article 10a can have any suitable shape; for example, the optical article can be spherical, toric, or aspherical. To illustrate, optical article 10a can have an inner surface 14, e.g., defined by first lens surface 42a, and an outer surface 18, e.g., defined by second protective surface 46b. Inner surface 14 can be concave and outer surface 18 can be convex; in other embodiments, however, each of the inner and outer surfaces can be concave, convex, or planar, based on the intended use for optical article 10a.

Lens 34 can include optical elements 22, each of which can be any suitable optical element, e.g., for refracting light, such as, for example, a microlens, a Fresnel ring, and the like. Each of optical elements 22 can be concave or convex and can define a portion of second lens surface 42b. As shown, each of optical elements 22 comprises a microlens that is convex. At least a portion of a convex optical element, e.g., 22, can define a convex optical element surface, e.g., 50, and/or the convex optical element can have one or more portions that project outwardly from lens 34 (or from protective layer 38, if defined thereby as described in further detail below). If an optical element, e.g., 22, is concave, at least a portion of the optical element can define a concave optical element surface, e.g., 50, and/or the concave optical element can have one or more portions that are recessed in lens 34 (or in protective layer 38, if defined thereby as described in further detail below).

Optical elements 22 can be arranged in any suitable manner. For example, optical elements 22 can be defined within a first area 26 that spans across all or part of second lens surface 42b. In some embodiments, second lens surface 42b can have one or more second areas 30 having no optical elements, e.g., in an area surrounded by first area 26 and/or at the periphery of optical article 10a. Each of optical elements 22 can have a maximum height 54, e.g., measured in a direction perpendicular to first protective surface 46a or second lens surface 42b, that is less than or equal to 0.1 millimeters (mm), such as, for example, less than or equal to or between any two of 100 micrometers (μm), 90 μm, 80 μm, 70 μm, 60 μm, 50 μm, 40 μm, 30 μm, 20 μm, 10 μm, 5 μm, 1 μm, or smaller. Each of optical elements 22 can have a diameter 58 that is less than or equal to 2.0 mm, such as, for example, less than or equal to or between any two of 2.0 mm, 1.5 mm, 1.0 mm, 0.5 mm, 0.1 mm, 80 μm, 60 μm, 40 μm, 20 μm, or smaller. And, without limitation, lens 34 can have a minimum thickness 68, measured between first and second lenses surfaces 42a and 42b in a direction perpendicular to the second lens surface, than is greater than or equal to 1 mm, such as for example, greater than or equal to or between any two of, 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, or larger.

Protective layer 38 can be coupled to lens 34 such that first protective surface 46a is disposed on second lens surface 42b. Protective layer 38 can fully encapsulate optical elements 22. For example, protective layer 38 can have a maximum thickness 62, e.g., measured in a direction perpendicular to first protective surface 46a, that is larger than maximum height 54 of each of optical elements 22. Minimum thickness 64 of protective layer 38 can also, in some embodiments, be larger than maximum height 54. To illustrate, and without limitation, maximum thickness 62 and/or minimum thickness 64 of protective layer 38 can be greater than or equal to 0.1 mm, such as, for example, greater than or equal to or between any two of 0.5 mm, 0.7 mm, 0.9 mm, 1.1 mm, 1.2 mm, 1.4 mm, or larger, e.g., greater than or equal to 0.6 mm. Optical elements 22 can thus be fully encapsulated within a volume 66 defined between second protective surface 46b and first lens surface 42a. Protective layer 38, by fully encapsulating optical elements 22, can protect the optical elements with minimal, if any, alterations to the optical design of the optical elements to promote improved optics in optical article 10a, compared to conventional protective coatings, which can change the geometric shape and thus the optical design of the optical elements.

The addition value of optical elements 22 can depend at least in part on the materials used in lens 34 and protective layer 38. For example, lens 34 can comprise a higher-index material and protective layer 38 can comprise a lower-index material having an index of refraction that is lower than that of the higher-index material such that optical elements 22 create a positive addition value, e.g., for myopia control. Alternatively, protective layer 38 can comprise the higher-index material and lens 34 can comprise the lower-index material such that optical elements 22 create a negative addition value, e.g., for hyperopia control. Suitable materials for lens 34 and/or protective layer 38 can include any optical material-such as, for example, polycarbonate, co-polyester, thermoplastic polyurethane, poly(methyl methacrylate), polyamide, bio-engineered polymers, cellulose triacetate, allyl diglycol carbonate, polyepisulfides, trivex, polyacrylics, polyols, polyamines, polyanhydrides, polycarboxilic acids, polyepoxides, polyisocyanates, polynorbornenes, polysiloxanes, polysilazanes, polystyrenes, polyolefinics, polyesters, polyimides, polyurethanes, polythiourethanes, polyallylics, polysulfides, polyvinylesters, polyvinylethers, polyarylenes, polyoxides, polysulfones, poly cyclo olefins, polyacrylonitriles, polyethylene terephtalates, polyetherimides, polypentenes, and the like-having an appropriate index of refraction for obtaining the desired optical element addition value. To illustrate, and without limitation, suitable lower-index materials can have an index of refraction that is less than or equal to, or between any two of, 1.55, 1.54, 1.53, 1.52, 1.51, 1.50, 1.49, 1.48, 1.47, 1.46, 1.45, or lower, e.g., less than or equal to 1.55, and suitable higher-index materials can have an index of refraction that is greater than or equal to or between any two of 1.55, 1.57, 1.59, 1.61, 1.63, 1.65, 1.67, 1.69, 1.71, 1.73, 1.75, or higher, e.g., greater than or equal to 1.59. Optionally, the difference between the indices of refraction of the lower- and higher-index materials is greater than or equal to 0.1. If optical elements 22 are concave, the effect of the different indices of refraction between lens 34 and protective layer 38 on the optical element addition value can be the opposite of that described above.

Some of the present methods for forming an optical article, e.g., 10a-10h, comprise manufacturing a first optical member and coupling a second optical member to the first optical member. The first optical member can be a lens, e.g., 34, and the second optical member can be a protective layer, e.g., 38, e.g., as described below with reference to FIGS. 2A-2H. However, in other embodiments, the first optical member can be the protective layer and the second optical member can be the lens, e.g., as described below with reference to FIGS. 6A-6F.

Referring to FIGS. 2A-2D, shown is a first mold, e.g., 70, suitable for use in some of the present methods to manufacture a first optical member, e.g., lens 34 or protective layer 38, for one of the present optical articles, e.g., 10a-10h. The first mold can comprise first and second primary mold portions, e.g., 74a and 74b, each defining a molding surface, e.g., 78a, 78b, e.g., via mold inserts 82a, 82b. The molding surface of the second primary mold portion can define a plurality of concave recesses, e.g., 86, e.g., to form convex optical elements, and/or a plurality of convex protrusions, e.g., to form concave optical elements; as shown, the molding surface defines a plurality of concave recesses. Each of the molding surfaces can be concave, convex, or planar, depending on the desired article shape; for example, as shown, the molding surface of the first primary mold portion is convex. e.g., to form a concave optical surface, and the molding surface of the second primary mold portion is concave, e.g., to form a convex optical surface.

Figure 2A:
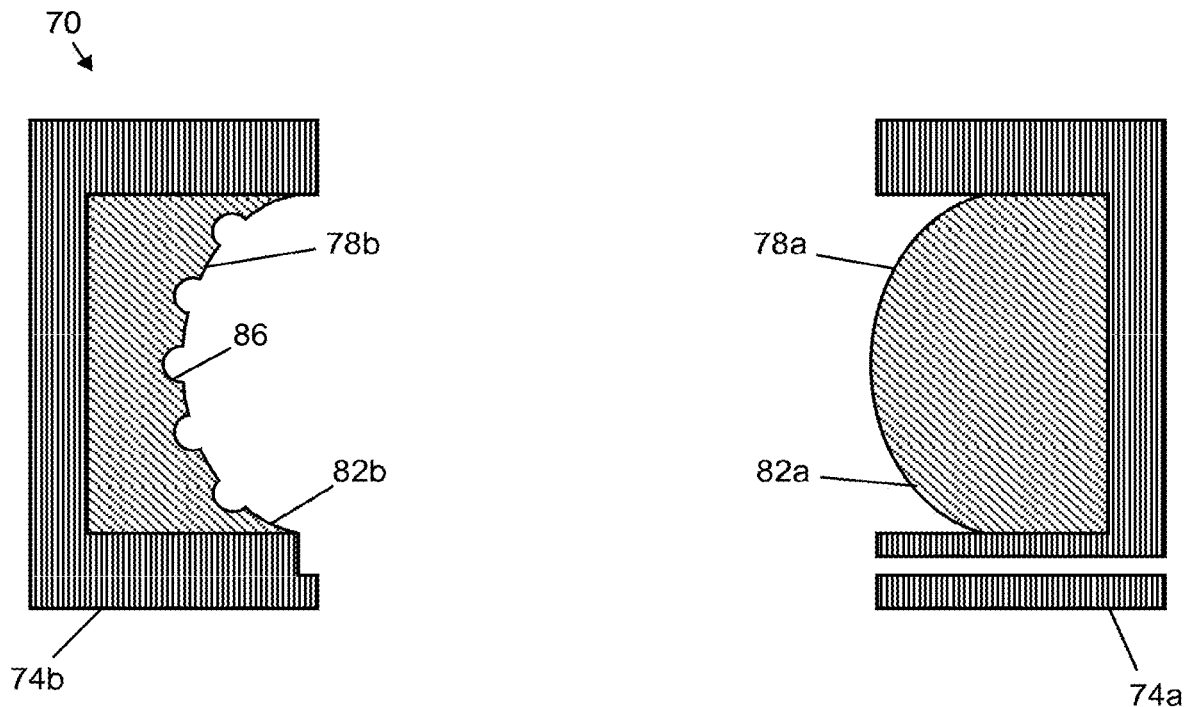
FIGS. 2A-2D schematically illustrate a first mold used in some of the present methods to form a lens having a plurality of optical elements.
Figure 2B:
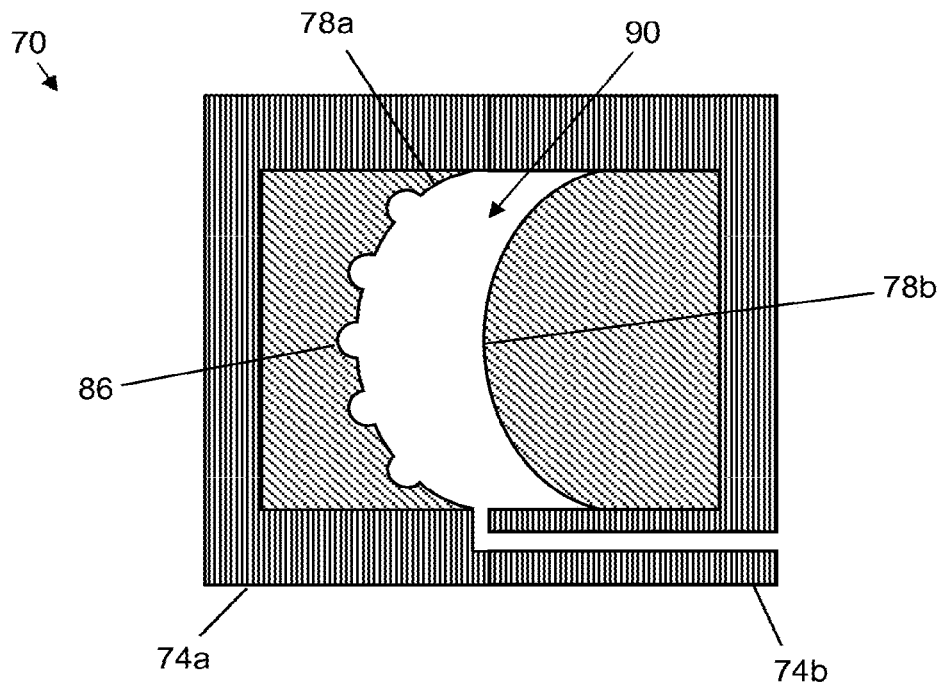
Figure 2C:
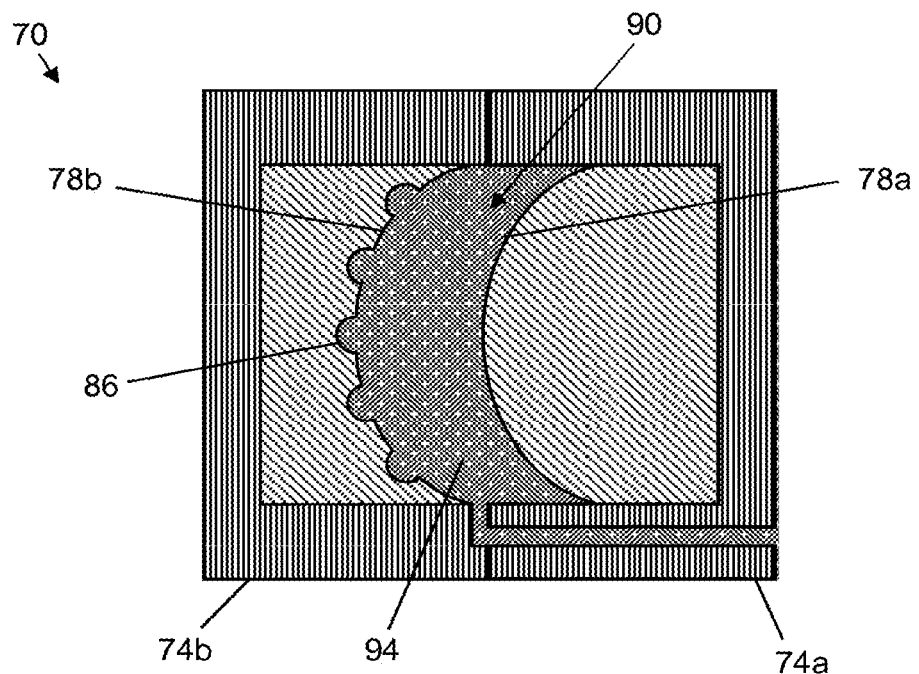
Figure 2D:
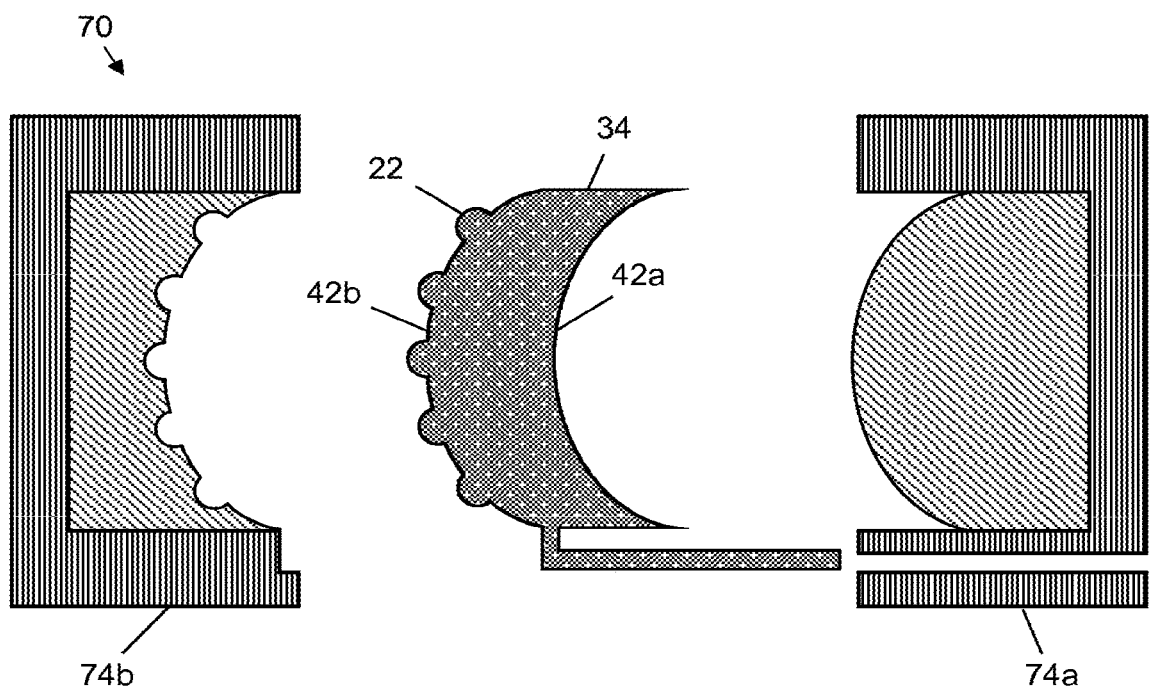
Figure 2E:
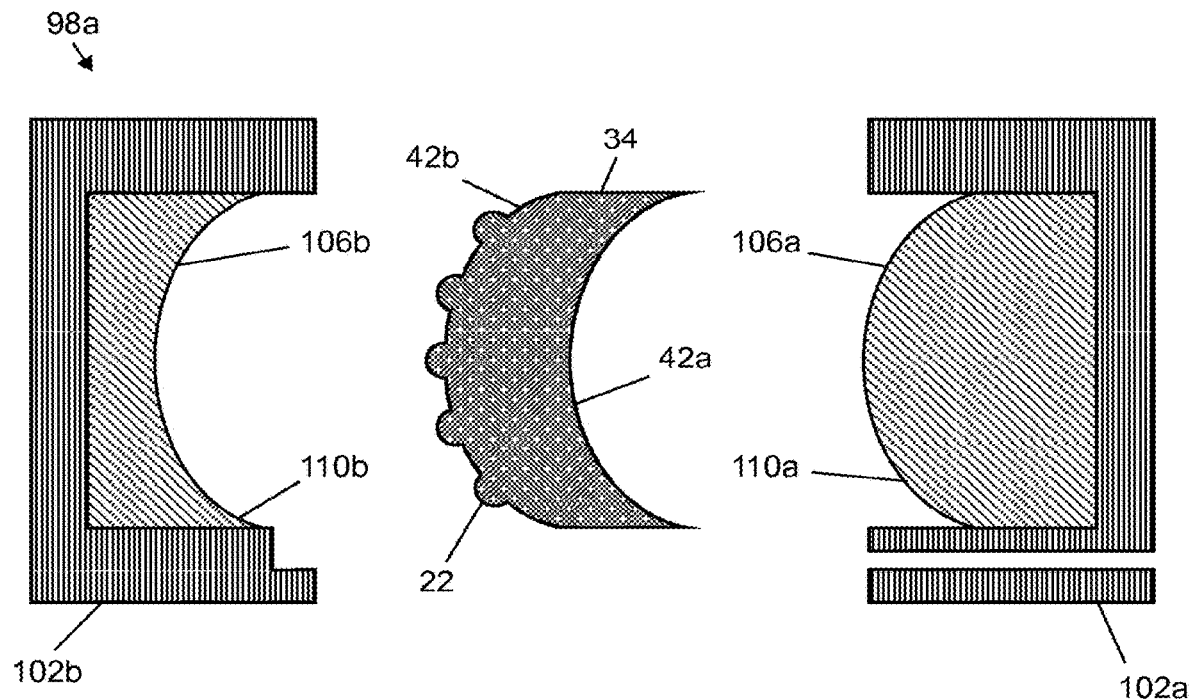
FIGS. 2E-2H schematically illustrate a second mold used in some of the present methods to form and couple a protective layer to encapsulate the optical elements.
Figure 2F:
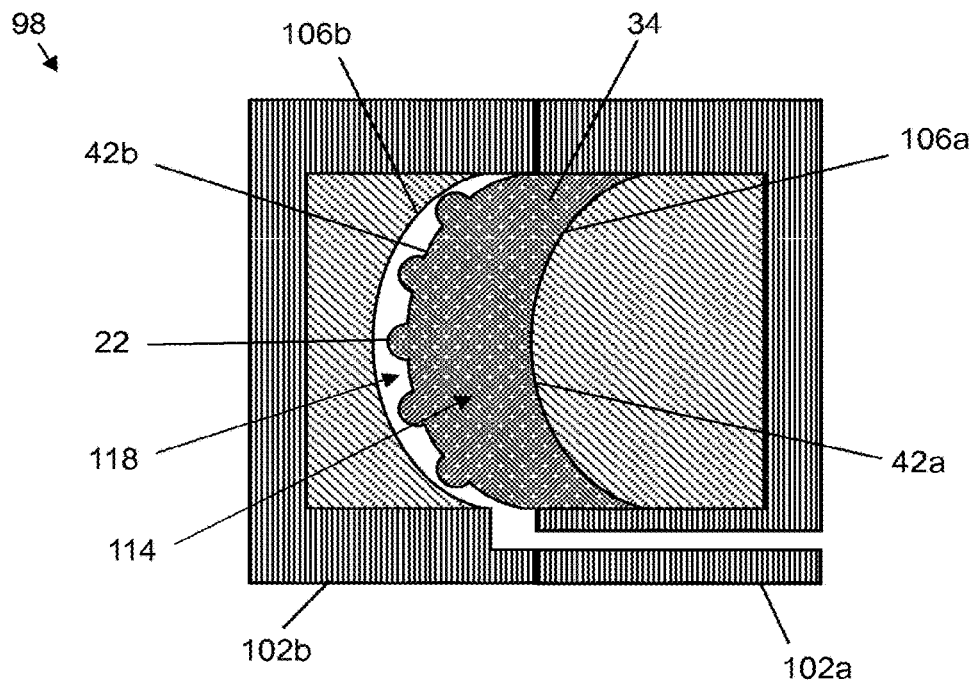
Figure 2G:
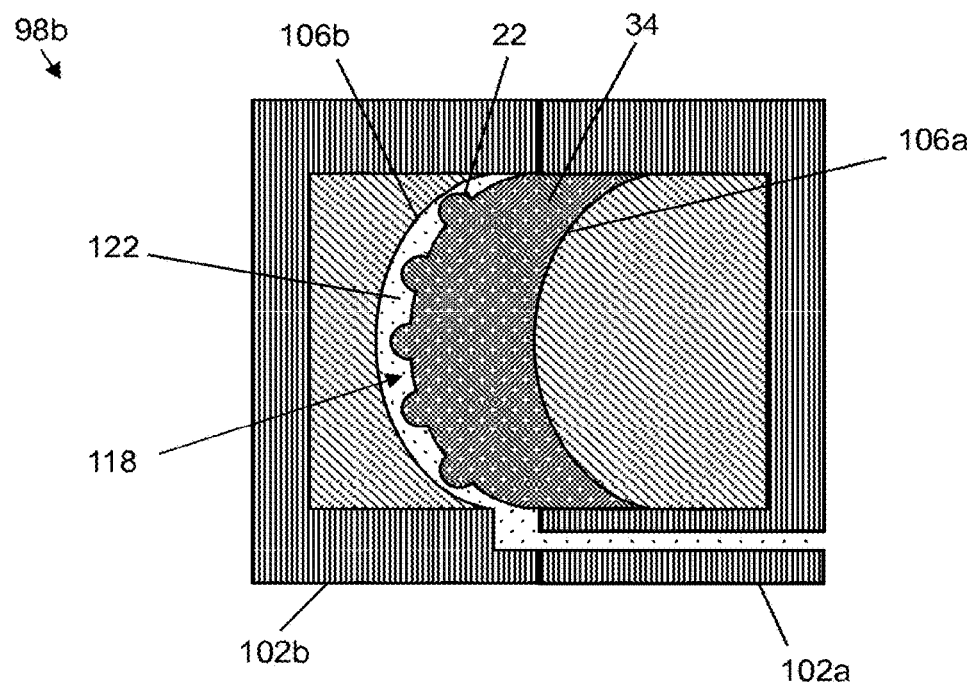

Some of the present methods comprise moving the first and second primary mold portions from an open position (FIG. 2A) to a closed position (FIG. 2B) in which the primary mold portions cooperate to define a first mold cavity, e.g., 90. To form a first optical member, e.g., lens 34 or protective layer 38, some methods comprise introducing a first moldable material, e.g., 94, into the first mold cavity (FIG. 2C) and setting the first moldable material, e.g., by curing and/or cooling (FIG. 2D). The forming can be performed via, for example, injection molding or casting. The resulting first optical member can have opposing first and second optical surfaces, e.g., first and second lens surfaces 42a and 42b, if a lens, or first and second protective surfaces 46a and 46b, if a protective layer, where the second optical surface defines a plurality of optical elements, e.g., 22. Concave recesses and/or convex protrusions, e.g., 86, of the second primary mold portion can be shaped and sized such that the optical elements defined on the second optical surface are shaped and sized as described above with respect to FIGS. 1A-1C. As shown, the first mold is used to form a lens 34, e.g., of optical articles 10a-10b and 10d-10h. In other embodiments, however, the first mold can be used to produce protective layer 38, e.g., of optical article 10c, described below.

Referring to FIGS. 2E-2H, shown is a second mold, e.g., 98a, suitable for use in some of the present methods to form and couple a second optical member, e.g., protective layer 38, to the second optical surface of the first optical member. The coupling can be performed such that the second optical member fully encapsulates the optical elements defined on the second optical surface. The second mold can comprise first and second secondary mold portions, e.g., 102a and 102b, each defining a molding surface, e.g., 106a, 106b, e.g., via mold inserts 110a, 110b. Each of the molding surfaces can be concave, convex, or planar, depending on the desired article shape; for example, as shown, the molding surface of the first primary mold portion is convex, e.g., to receive the concave first optical surface, and the molding surface of the second primary mold portion is concave, e.g., to form a convex optical surface.

Figure 2H:
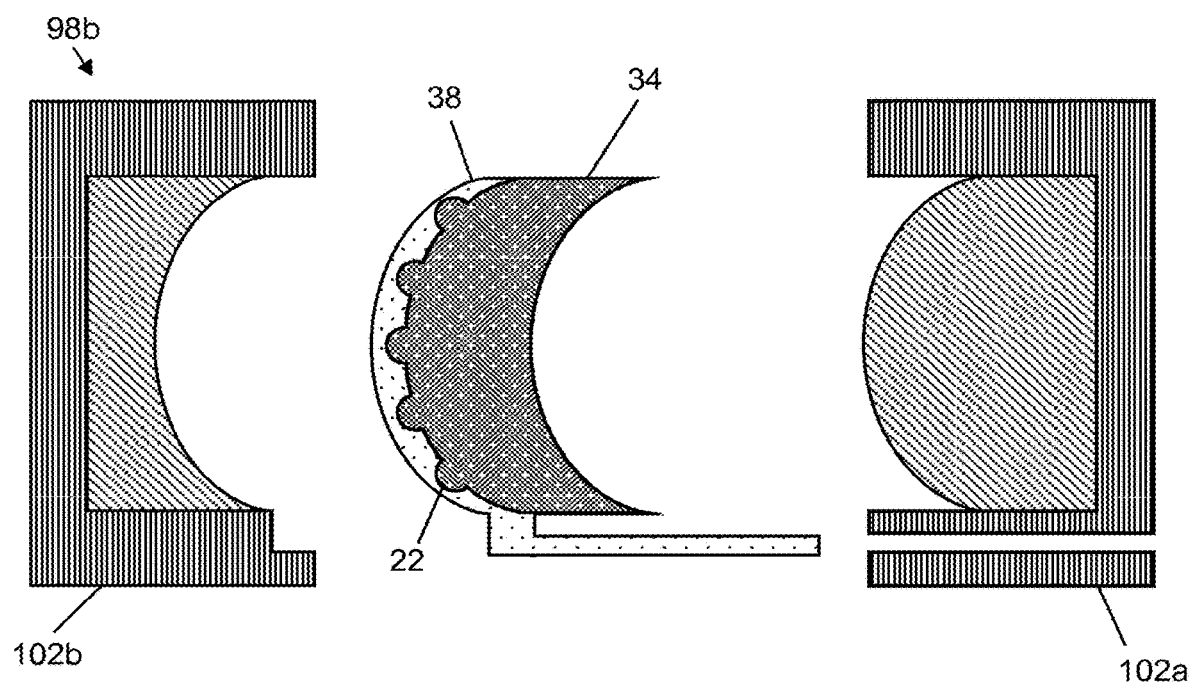

Some of the present methods comprise placing the first optical member on the second mold such that the first optical surface is disposed on the molding surface of the first secondary mold portion. After the placing, some methods comprise moving the first and second secondary mold portions from an open position (FIG. 2E) to a closed position (FIG. 2F) in which the secondary mold portions cooperate to define a second mold cavity, e.g., 114. The second mold cavity can be larger than the first optical member such that a volume, e.g., 118, is defined between the molding surface of the second secondary mold portion and the second optical surface. To form and couple the second optical member to the first optical member, some methods comprise introducing a second moldable material, e.g., 122, into the volume (FIG. 2G) and setting the second moldable material, e.g., by curing and/or cooling (FIG. 2H). The forming can be performed via injection molding or casting. The resulting second optical member can be coupled to the second optical surface and can have a thickness, e.g., measured in a direction perpendicular to the second optical surface between first and second surfaces of the second optical member, that is larger than the maximum height of each of the optical elements such that the second optical member fully encapsulates the optical elements, e.g., such that the optical elements are encapsulated within a volume defined by the second surface, e.g., 46b, and the first optical surface, e.g., 42a. As shown, the second mold is used to form a protective layer 38 on lens 34, e.g., as in optical articles 10a-10b and 10d-10h, which can be, for example, a wafer as described in reference to optical article 10a.

The first and second moldable materials can be any suitable moldable material of optical quality, e.g., any of those described above, and can be selected such that the optical elements provide the desired addition value. For example, as shown, the first moldable material, and thus, e.g., lens 34, can have a first index of refraction and the second moldable material, and thus, e.g., protective layer 38, can have a second index of refraction lower than the first index of refraction such that the optical elements provide a positive addition value, e.g., for myopia control, or vice versa such that the optical elements provide a negative addition value, e.g., for hyperopia control.

Manufacturing and coupling the first and second optical members, e.g., lens 34 and protective layer 38, by injection molding or casting can facilitate reliable encapsulation of the optical elements with minimal, if any, impact on the optical design of the optical elements.

Figure 3A:
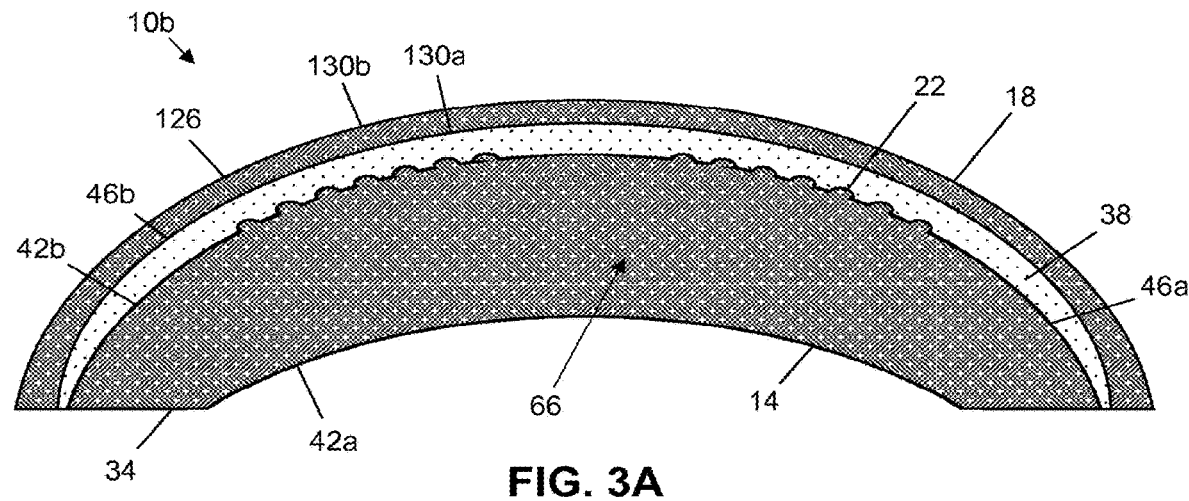
FIGS. 3A and 3B are sectional views of a second embodiment of the present optical articles having a second lens coupled to the encapsulating protective layer.
Figure 3B:
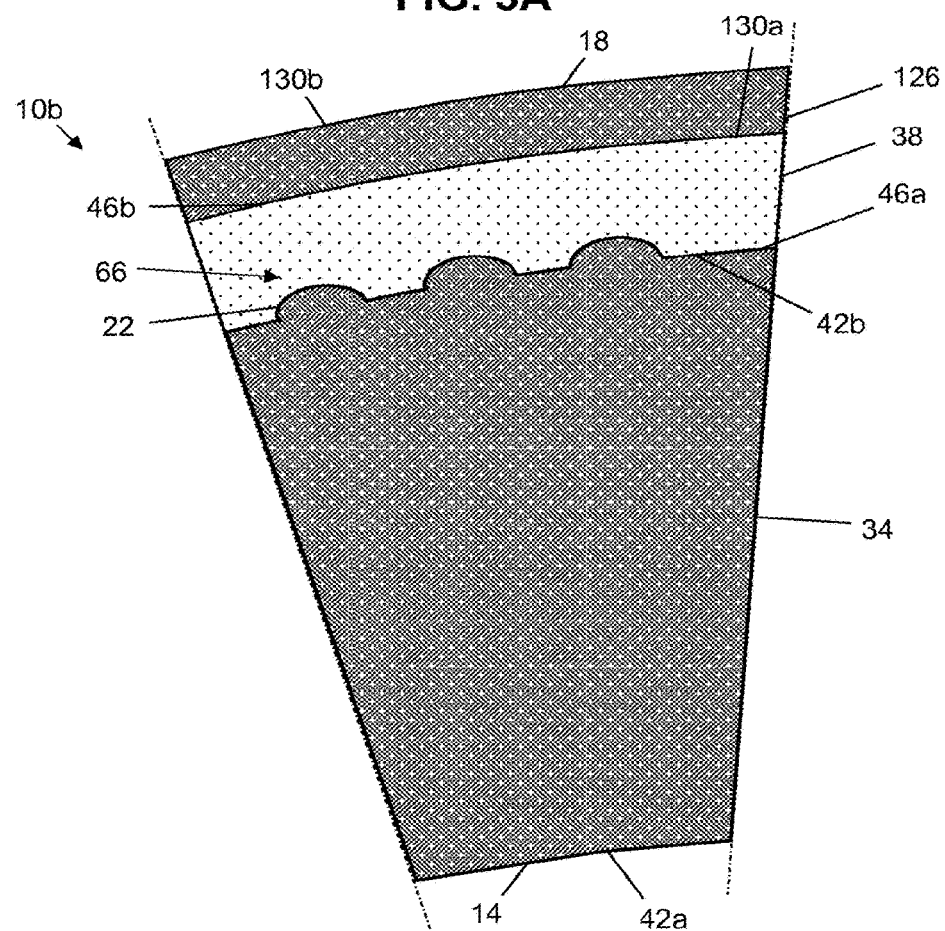

Referring to FIGS. 3A and 3B, shown is an optical article 10b that is substantially similar to optical article 10a, the primary exception being that optical article 10b comprises a second lens 126. Second lens 126 can have opposing inner and outer second lens surfaces 130a and 130b and can be coupled to protective layer 38 such that inner second lens surface 130a is disposed on second protective surface 46b. For example, outer second lens surface 130b can define outer surface 18 of optical article 10b. Optionally, one or more coatings can be disposed on second lens 126, e.g., on outer second lens surface 130b, such as, for example, a scratch-resistant coating, an antireflective coating, and/or any of the coatings described below in reference to optical article 10d. Second lens 126 can provide additional protection for optical elements 22 and can contribute to the addition power of optical article 10b. Optionally, second lens 126 can comprise the same material as lens 34. While second lens 126 is described as a lens, the second lens can be any suitable optical member, such as, for example, a wafer or a shell.

Some of the present methods comprise forming and coupling a third optical member, e.g., second lens 126, to the second optical member, e.g., protective layer 38. Referring to FIGS. 4A-4D, shown is a third mold, e.g., 134, suitable for use in some of the present methods to form a third optical member. The third mold can have first and second tertiary mold portions, e.g., 138a and 138b, each defining a molding surface, e.g., 142a, 142b, e.g., via mold inserts 146a, 146b. Each of the molding surfaces can be concave, convex, or planar, depending on the desired article shape. For example, as shown, the molding surface of the first tertiary mold portion is convex, e.g., to receive the concave first optical surface, and the molding surface of the second tertiary mold portion is concave, e.g., to form a convex optical surface.

Figure 4A:
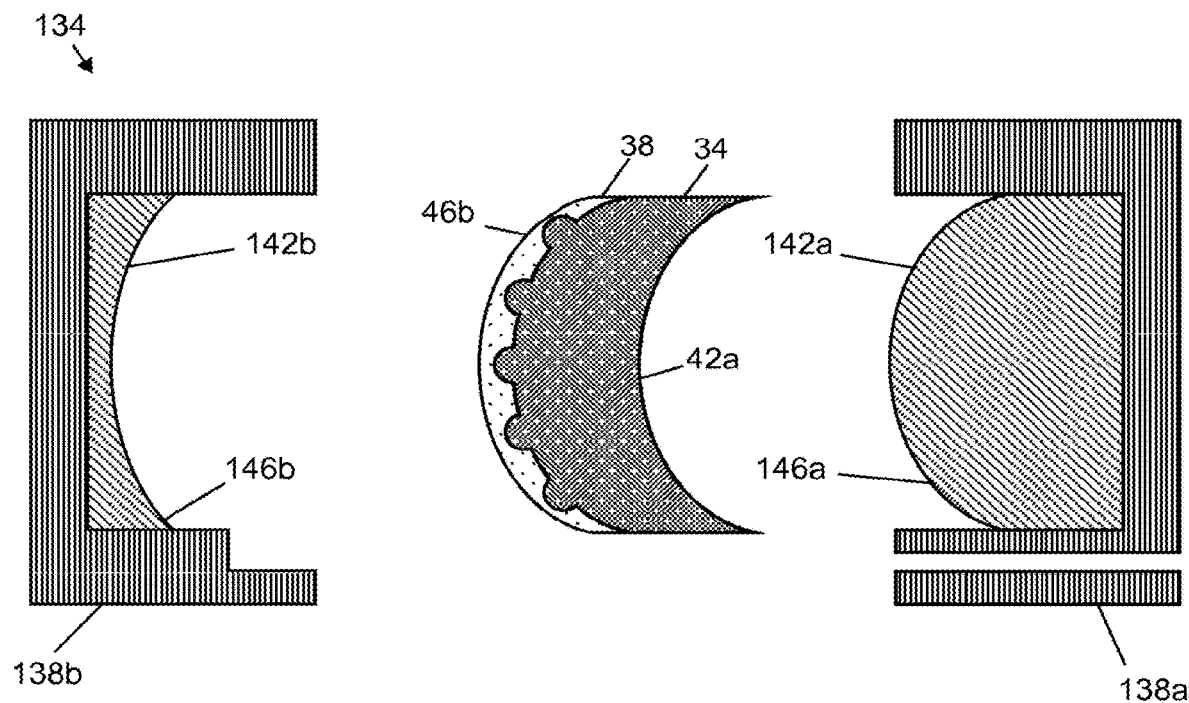
FIGS. 4A-4D schematically illustrate a third mold used in some of the present methods to form and coupled the second lens to the encapsulating protective layer.
Figure 4B:
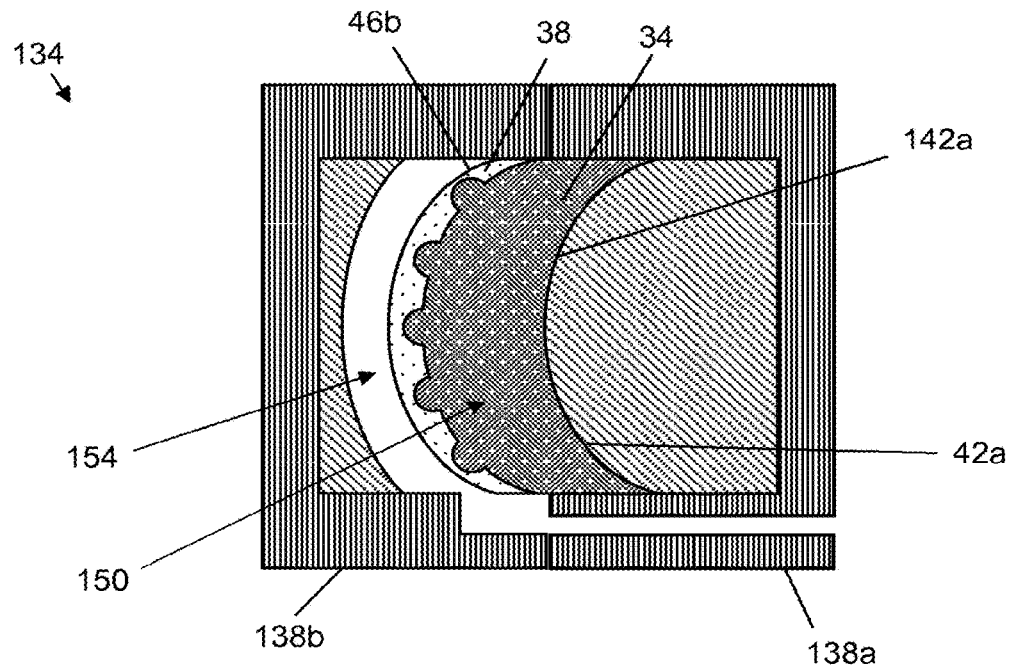
Figure 4C:
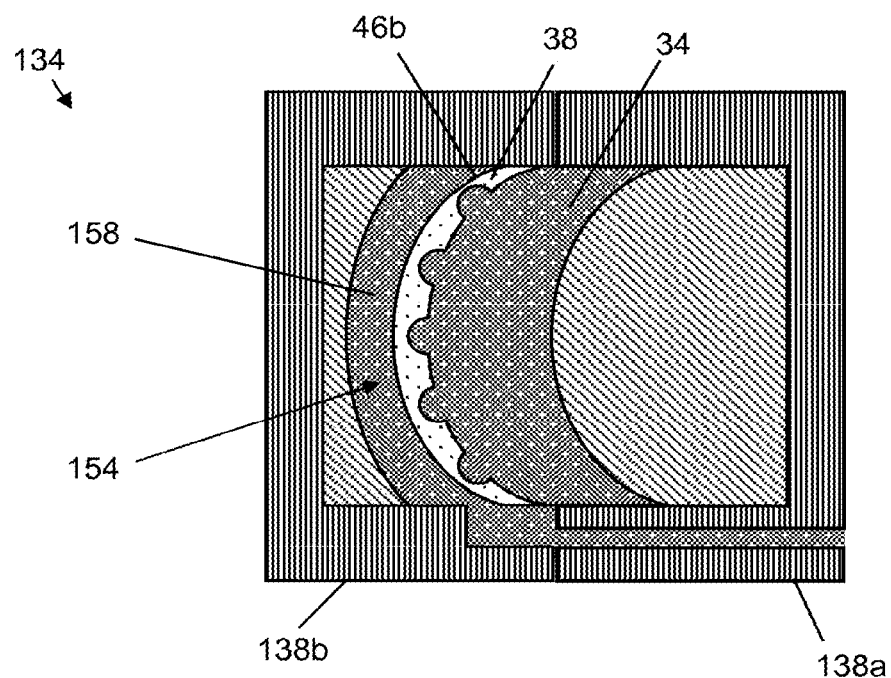
Figure 4D:
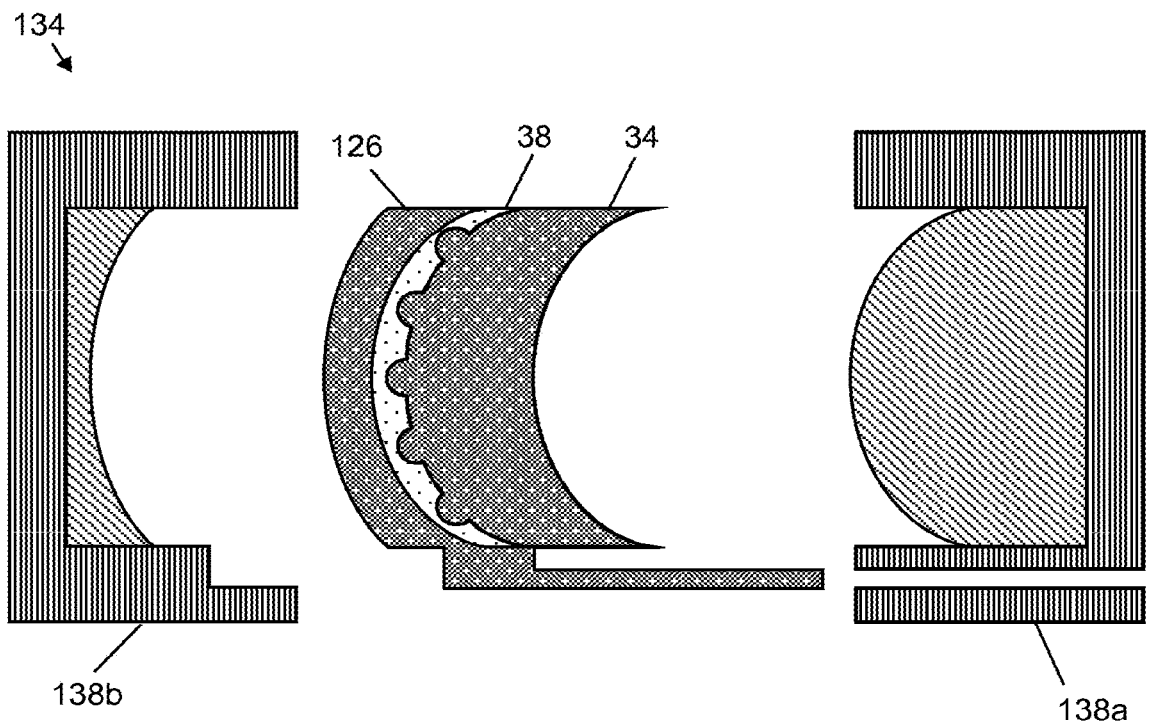

Some of the present methods comprise placing the first and second optical members on the third mold such that the first optical surface, e.g., first lens surface 42a, is disposed on the molding surface of the first tertiary mold portion. After the placing, some methods comprise moving the first and second tertiary mold portions from an open position (FIG. 4A) to a closed position (FIG. 4B) in which the tertiary mold portions cooperate to define a third mold cavity, e.g., 150. The third mold cavity can be larger than the first and second optical members such that a volume, e.g., 154, is defined between the second surface, e.g., second protective surface 46b, of the second optical member and the molding surface of the second tertiary mold portion. To form and couple the third optical member to the second optical member, some methods comprise introducing a third moldable material, e.g., 158, into the volume (FIG. 4C) and setting the third moldable material, e.g., by curing and/or cooling (FIG. 4D). Optionally, the first moldable material is the same as the third moldable material. The forming can be performed via, for example, injection molding or casting, and the resulting third optical member can be coupled to the second optical member, e.g., to produce optical article 10b.

Figure 5A:
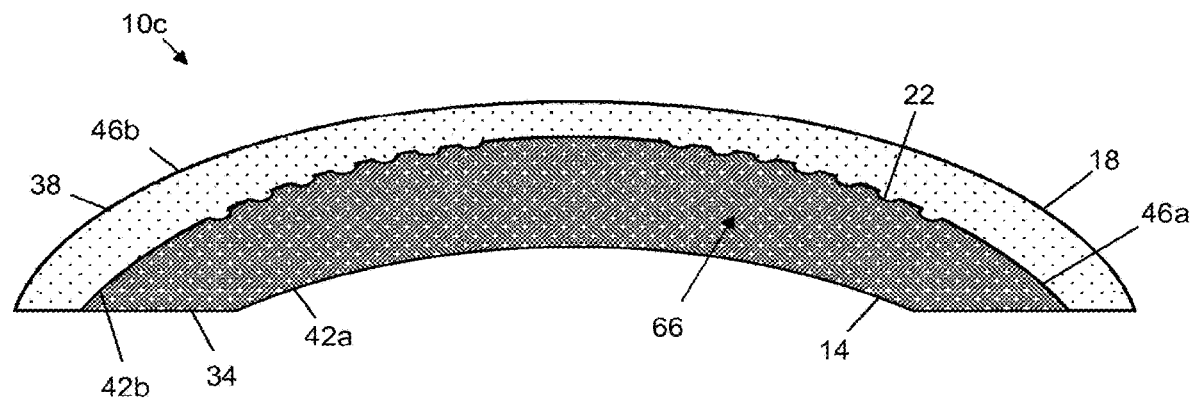
FIGS. 5A and 5B are sectional views of a third embodiment of the present optical articles in which the encapsulated optical elements are defined by an inner surface of the protective layer.
Figure 5B:
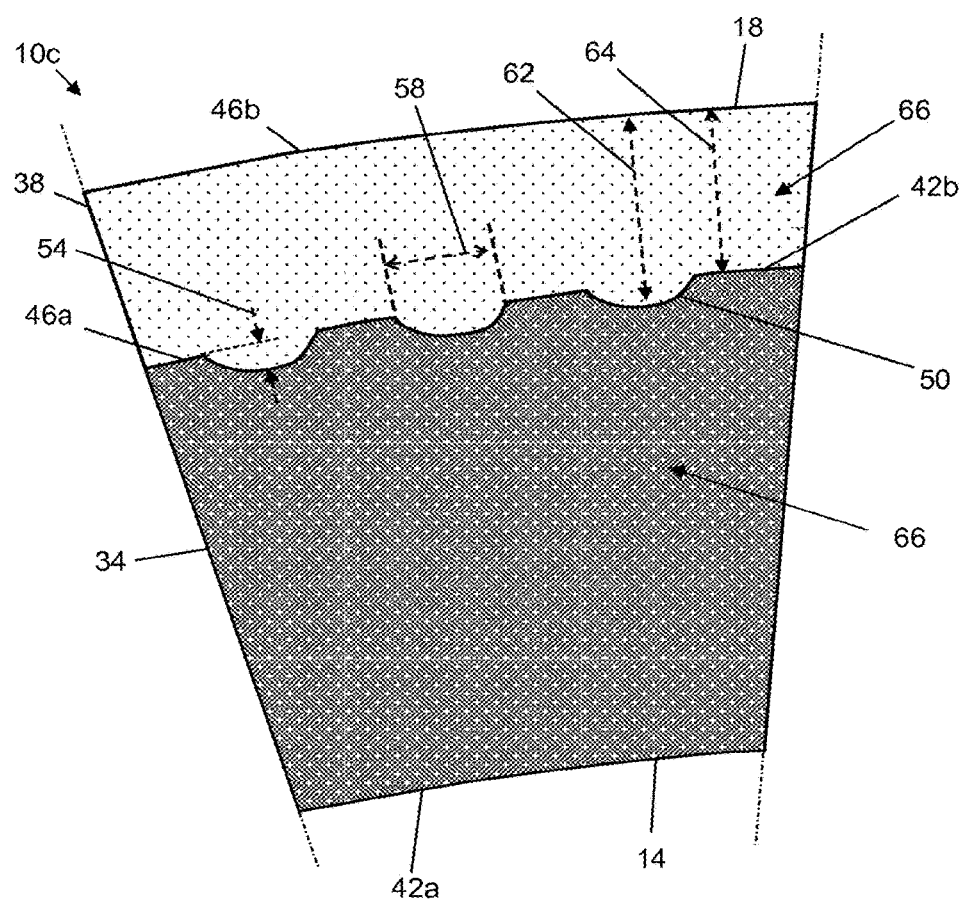

Referring to FIGS. 5A and 5B, shown is an optical article 10c that is substantially similar to optical article 10a, the primary exception being that protective layer 38 rather than lens 34—comprises optical elements 22, e.g., such that each of the optical elements defines a portion of first protective surface 46a. For example, as with optical article 10a, maximum thickness 62 of protective layer 38 can be larger than maximum height 54 of each of optical elements 22 such that the protective layer encapsulates the optical elements, e.g., the optical elements are encapsulated within a volume 66 defined between second protective surface 42b and first lens surface 42a. And, as shown, each of optical elements 22 is convex (e.g., can have an optical element surface 50 that is convex); however, in other embodiments, each of the optical elements can be concave (e.g., can have an optical element surface that is concave). Because convex optical elements 22 are defined on first protective surface 46a, e.g., are inverted compared to the optical elements of optical article 10a, the materials used in lens 34 and protective layer 38 can affect the addition value of the optical elements differently than for optical article 10a. For example, as shown, optical elements 22 can provide a positive addition value, e.g., for myopia control, when protective layer 38 is manufactured from a higher-index material and lens 34 is manufactured from a lower-index material having an index of refraction lower than that of the higher-index material. Alternatively, optical elements 22 can provide a negative addition value, e.g., for hyperopia control, when protective layer 38 is manufactured from the lower-index material and lens 34 is manufactured from the higher-index material.

As shown, second protective surface 46b of protective layer 38 defines outer surface 18 of optical article 10c. In other embodiments, however, the optical article can comprise one or more additional layers coupled to second protective surface 46b, such as, for example, a second lens, e.g., 126, as described in reference to optical article 10b. Some of such embodiments—e.g., when optical elements 22 are concave—can be substantially similar to optical article 10b.

Figure 6A:
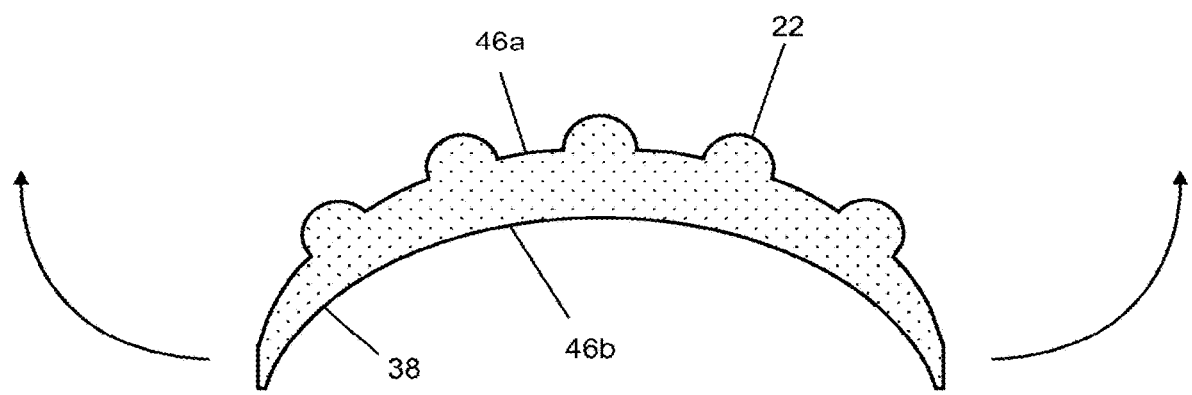
FIGS. 6A and 6B schematically illustrate bending and inverting a protective layer formed using the mold of FIGS. 2A-2D to produce the protective layer of FIGS. 5A and 5B.
Figure 6B:
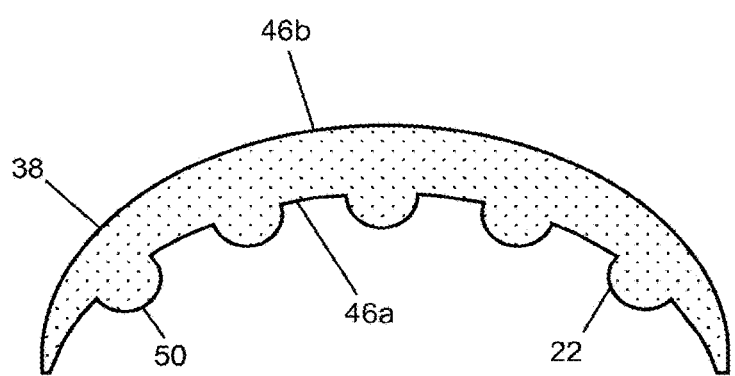
Figure 6C:
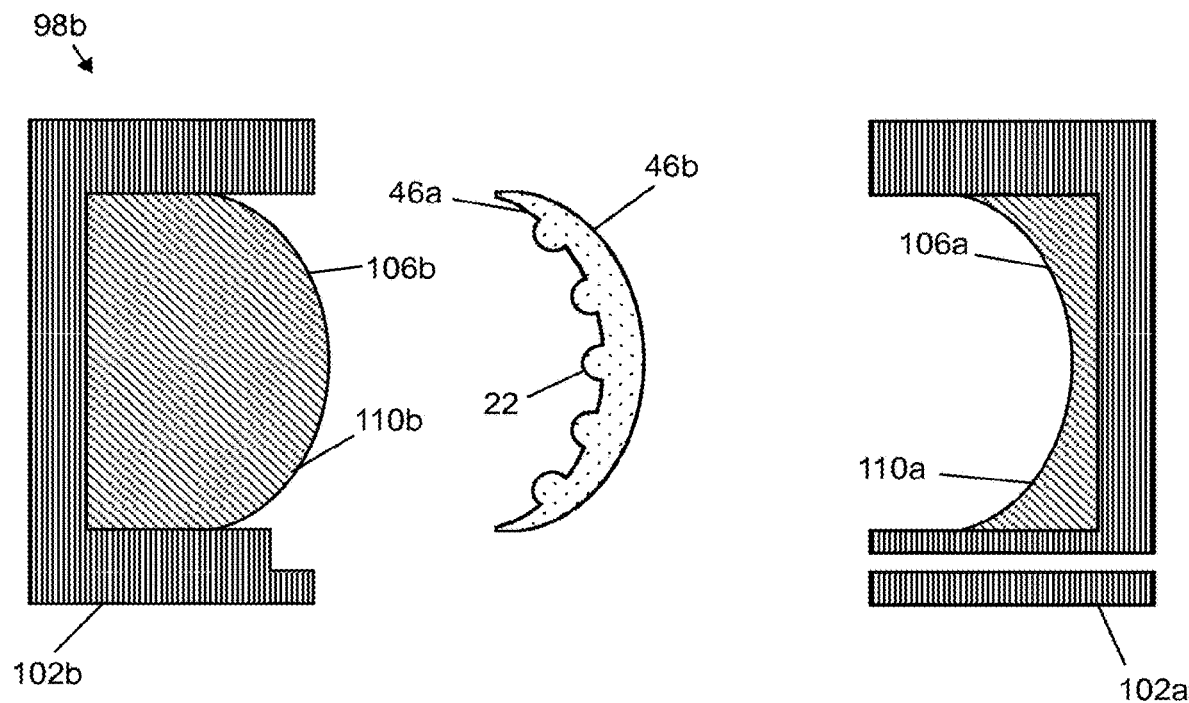
FIGS. 6C-6F schematically illustrate a second mold used in some of the present methods to form and couple a lens to the protective layer formed in FIGS. 6A and 6B.
Figure 6D:
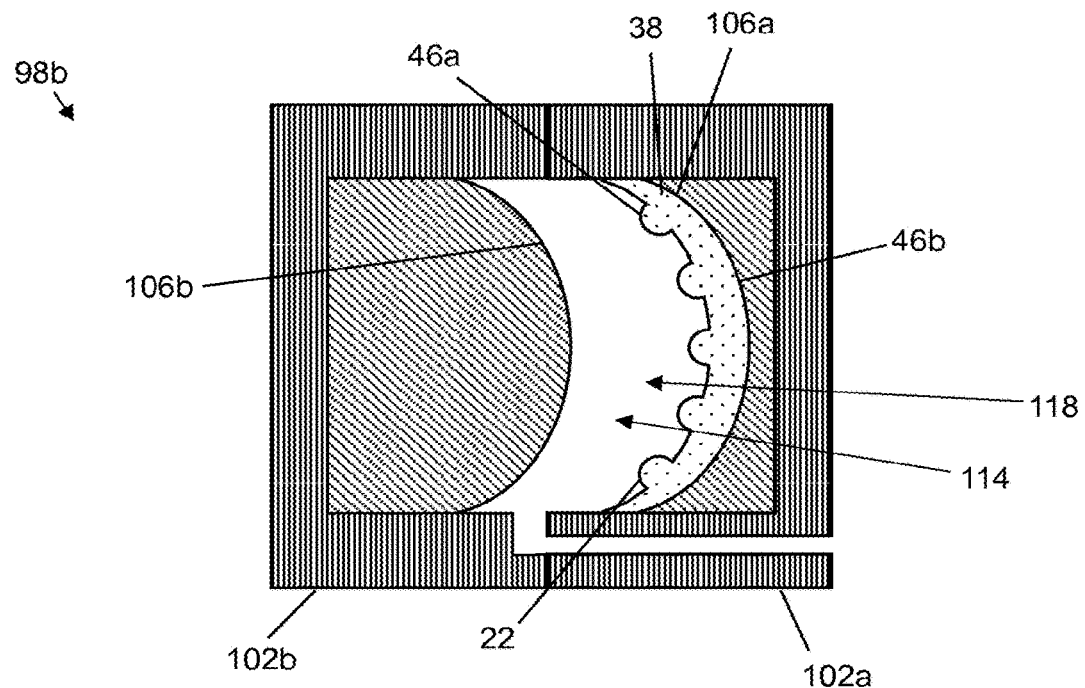
Figure 6E:
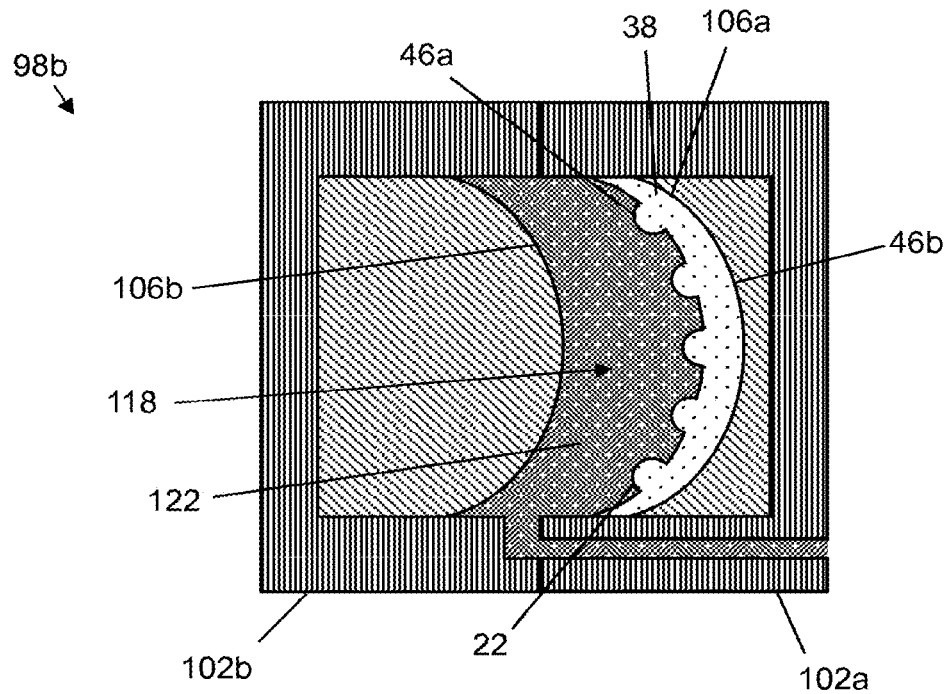

In some methods, a protective layer, e.g., 38, having optical elements, e.g., 22, defined on its first protective surface, e.g., 46a, can be formed with the first mold as described in reference to FIGS. 2A-2D. Referring to FIGS. 6A and 6B, the first mold, as it is shown in FIGS. 2A-2D, can produce a first optical member, e.g., protective layer 38, having a convex second optical surface, e.g., first protective surface 46a, and a concave first optical surface, e.g., second protective surface 46b (FIG. 6A). Some methods comprise bending and thereby, e.g., permanently, inverting the first optical member such that the first optical surface, e.g., 46b, is convex and the second optical surface, e.g., 46a, is concave (FIG. 6B). The maximum thickness, e.g., 62, of the protective layer can be less than or equal to 1.5 mm, such as, for example, less than or equal to or between any two of 1.5 mm, 1.4 mm, 1.3 mm, 1.2 mm, 1.1 mm, 1.0 mm, 0.9 mm, 0.8 mm, 0.7 mm, 0.6 mm, or less, e.g., less than or equal to 1.0 mm or 0.7 mm, such that the protective layer has sufficient flexibility for the bending. As such, the first mold can be used to produce a protective layer having its optical elements defined on the concave first protective surface, e.g., as in optical article 10c, without the need for different mold inserts, thereby reducing costs and tooling requirements. In other embodiments, the protective layer, e.g., of optical article 10c, can be formed using different mold inserts than those shown in FIGS. 2A-2D. For example, different mold inserts can be used such that the concave recesses, e.g., 86, are defined on the convex molding surface of the first primary mold portion, rather than on the concave molding surface of the second primary mold portion.

Referring to FIGS. 6C-6F, shown is a second mold, e.g., 98b, that is substantially similar to second mold 98a and that can be used in some methods to form and couple a second optical member, e.g., lens 34, to the first optical member, e.g., protective layer 38. The primary difference between second molds 98a and 98b is that, for second mold 98b, the molding surface of the first secondary mold portion is concave, e.g., to receive the convex first optical surface, e.g., second protective surface 46b, and the molding surface of the second secondary mold portion is convex.

Figure 6F:
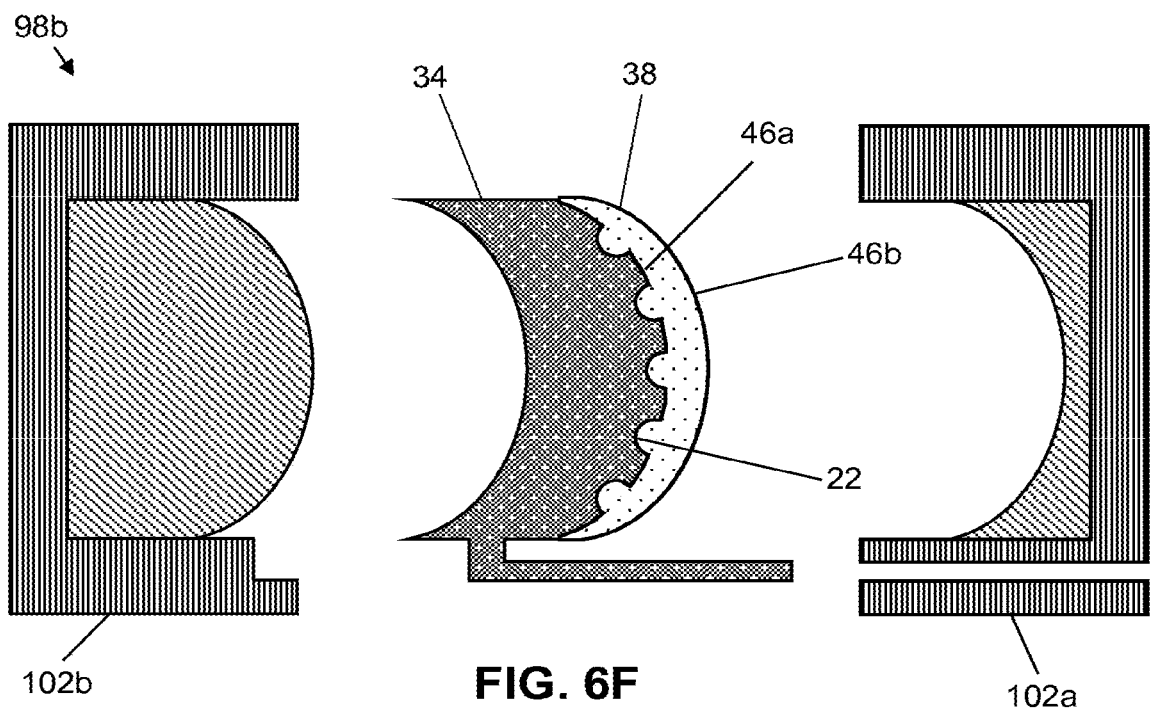

Encapsulation of the optical elements, e.g., 22, defined on the concave second optical surface, e.g., first protective surface 46a, can be achieved in substantially the same manner as described above with reference to FIGS. 2E-2H. Some methods comprise placing the first optical member on the second mold such that the first optical surface, e.g., second protective surface 46b, is disposed on the molding surface of the first secondary mold portion. After the placing, some methods comprise moving the first and second secondary mold portions from an open position (FIG. 6C) to a closed position (FIG. 6D) in which the secondary mold portions cooperate to define a second mold cavity, e.g., 114. The second mold cavity can be larger than the first optical member, e.g., protective layer 38, such that a volume, e.g., 118, is defined between the molding surface of the second secondary mold portion and the second optical surface. e.g., first protective surface 46a. To form and couple the second optical member, e.g., lens 34, to the first optical member, some methods comprise introducing a second moldable material, e.g., 122, into the volume (FIG. 6E) and setting the second moldable material, e.g., by curing and/or cooling (FIG. 6F). The forming can be performed via, e.g., injection molding or casting. The resulting second optical member, e.g., lens 34, can be coupled to the concave second optical surface, e.g., first protective surface 46a, of the first optical member, e.g., protective layer 38.

In some methods, a third optical member, e.g., second lens 126, can be formed and coupled to the first optical surface, e.g., second protective surface 46b, in substantially the same manner as described above with reference to FIGS. 4A-4D. In other methods, however, the second and third optical members can be coupled to the second and first optical surfaces, respectively, with a single mold, e.g., by introducing and setting moldable material in volumes defined by the mold on either side of the first optical member.

Figure 7A:
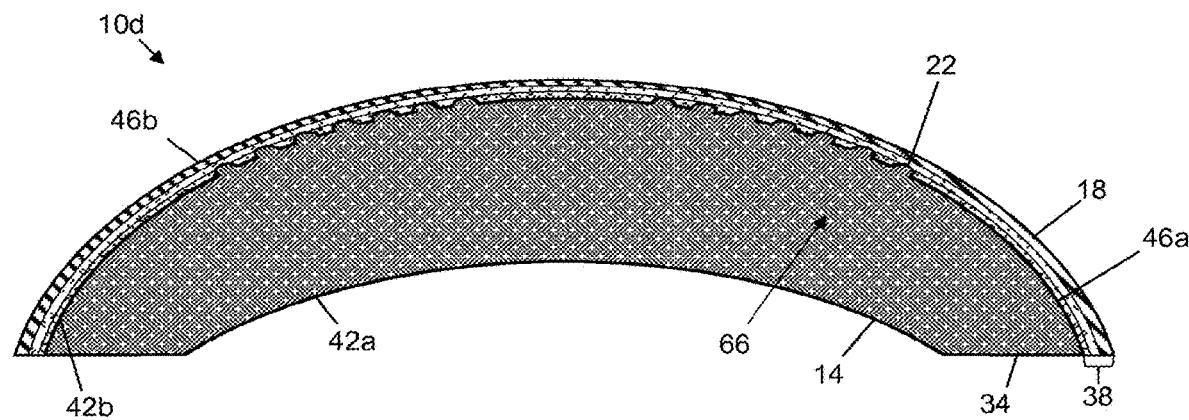
FIGS. 7A and 7B are sectional views of a fourth embodiment of the present optical articles in which one or more coatings define the protective layer.
Figure 7B:
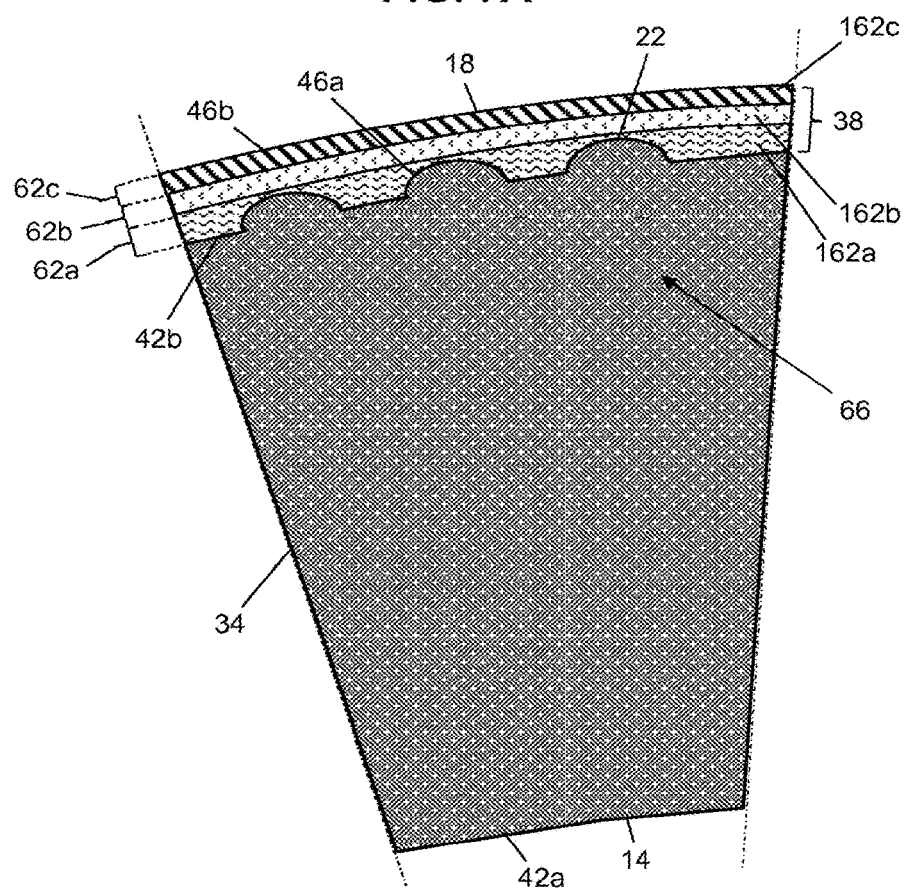

Referring to FIGS. 7A and 7B, shown is an optical article 10d that is substantially similar to optical article 10a, the primary exception being that protective layer 38 comprises one or more coatings, e.g., 162a-162b, that, collectively, fully encapsulate optical elements 22. At least one of, optionally each of, the coating(s) can comprise polyurethane coating, a scratch-resistant coating, an antireflective coating, a photochromic coating, an anti-smudge coating, an anti-fog coating, a tintable coating, a self-healing coating, an anti-rain coating, an anti-static coating, an anti-UV coating, or an anti-blue light coating. As shown, protective layer 38 comprises three coatings 162a-162c, where a polyurethane coating 162a is disposed on second lens surface 42b, a scratch-resistant coating, e.g., hard coating, 162b is disposed on the polyurethane coating, and an anti-reflective coating 162c is disposed on the scratch-resistant coating. Other embodiments, however, can comprise any suitable number of coatings, of any type, arranged in any suitable order.

Unlike conventional coatings, the present coating(s) can be applied to second lens surface 42b such that the protective layer 38 defined by the coating(s) fully encapsulates optical elements 22, e.g., as described with reference to FIGS. 1A-1C, and causes minimal, if any, alterations to the optical design of the optical elements. For example, each of the coating(s) can have a respective maximum thickness, e.g., 62a-62c, where the maximum thicknesses collectively are larger than maximum height 54 of each of optical elements 22. Each of the coatings, for example, can have a maximum thickness, e.g., 62a-62c, that is greater than or equal to, or between any two of, 1 µm, 5 µm, 10 µm, 20 µm, 30 µm, 40 µm, 50 µm, 60 µm, or larger, e.g., greater than or equal to 15 µm. The maximum thickness, e.g., 62a, of the coating, e.g., 162a, disposed on second lens surface 42b can, but need not, be greater than maximum height 54 of each of optical elements 22. The present coatings can thus define a protective layer 38 that can protect optical elements 22 and impart beneficial optical properties on optical article 10e, such as, for example, photochromic properties, anti-reflective properties, fog resistance, tinting, moisture resistance, and/or the like.

Figure 8A:
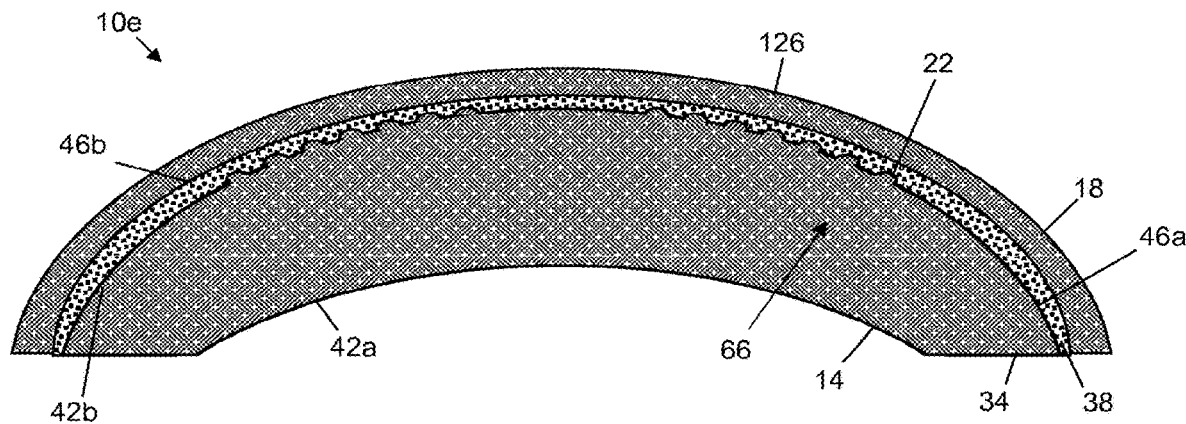
FIGS. 8A and 8B are sectional views of a fifth embodiment of the present optical articles in which the protective layer comprises a glue that adheres a second lens to the first lens.
Figure 8B:
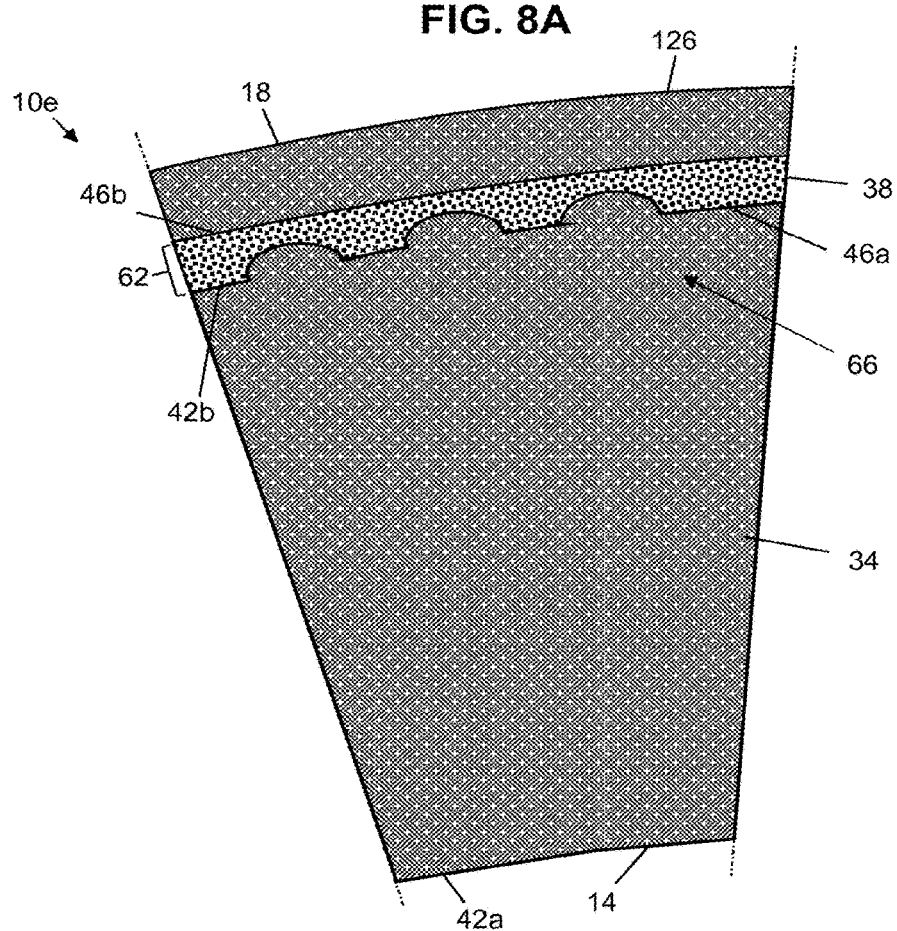

Referring to FIGS. 8A-8B, shown is an optical article 10e that is substantially similar to optical article 10b, the primary exception being that protective layer 38 comprises glue coupling and/or adhering second lens 126 to lens 34. The glue can comprise any optically suitable adhesive, such as, for example, an adhesive capable of conveying visible and/or ultraviolet light therethrough, e.g., a UV adhesive. Additionally, or alternatively, the glue can comprise one or more coatings, e.g., any of those described above, which can be cured and couple second lens 126 to lens 34. For example, such coating(s) can be deposited on second lens surface 42b and cured, e.g., to encapsulate optical elements 22, and second lens 126 can be molded onto second protective surface 46b of the coating(s), e.g., as described above. The glue can have an index of refraction that is less than that of lens 34 such that optical elements 22 provide a positive addition value, or that is greater than that of the lens such that the optical elements provide a negative addition value.

Figure 9A:
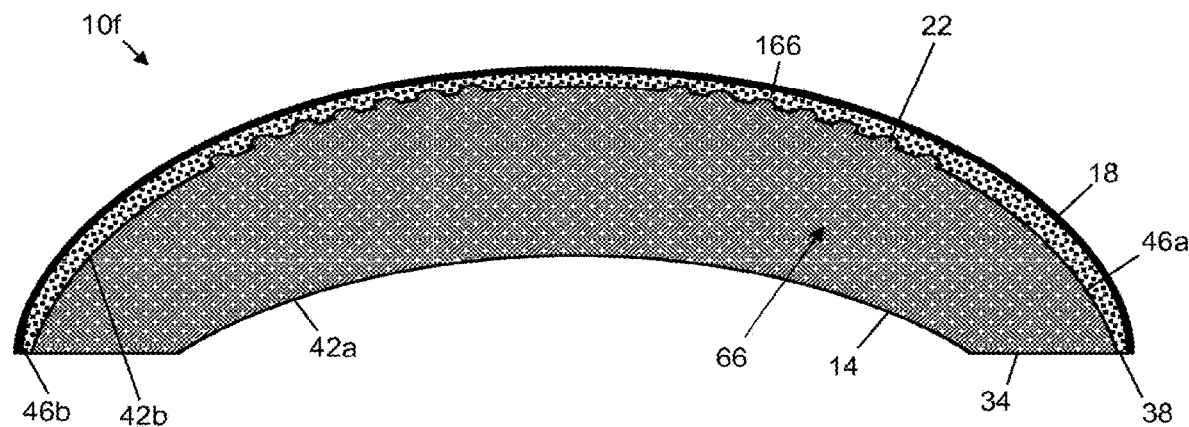
FIGS. 9A and 9B are sectional views of a sixth embodiment of the present optical articles in which the protective layer comprises a glue that adheres a film to the lens.
Figure 9B:
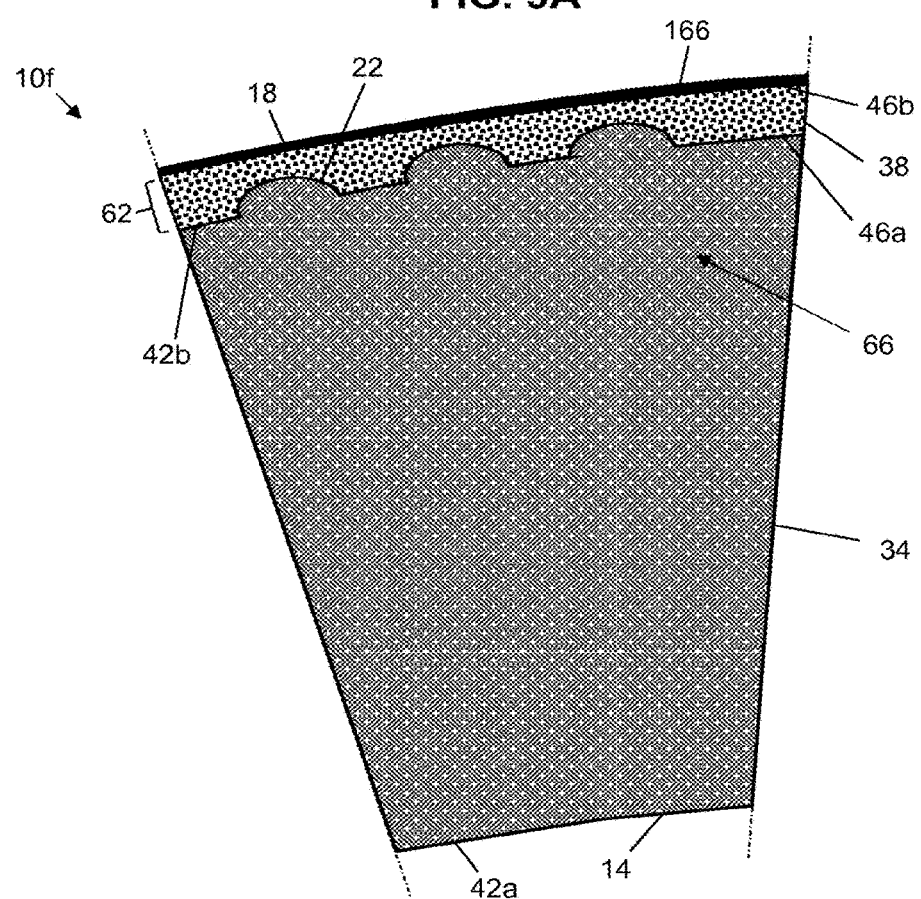

Referring to FIGS. 9A-9B, shown is an optical article 10f that is substantially similar to optical article 10e, the primary exception being that, instead of second lens 126, a film 166 is disposed on second protective surface 46b and is adhered to lens 34 via the glue of protective layer 38. Film 166 can provide protection for optical elements 22.

Figure 10:
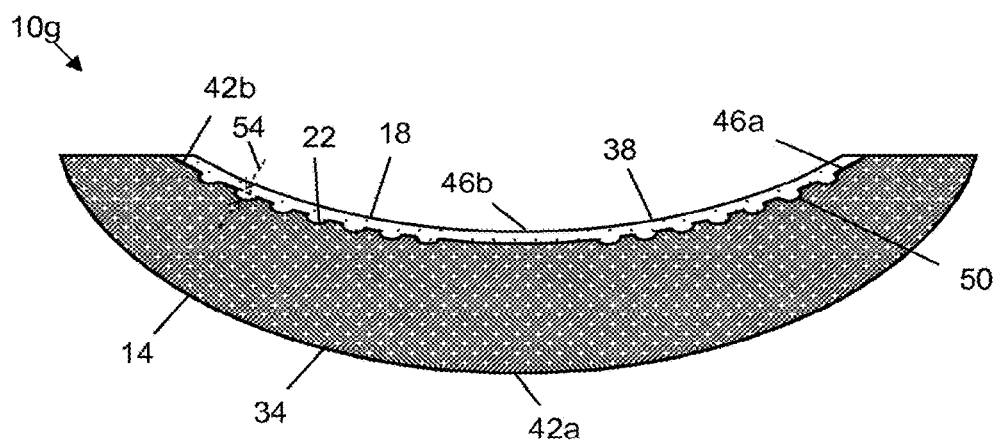
FIG. 10 is a sectional view of a seventh embodiment of the present optical articles in which the optical elements are each concave.
Figure 11:
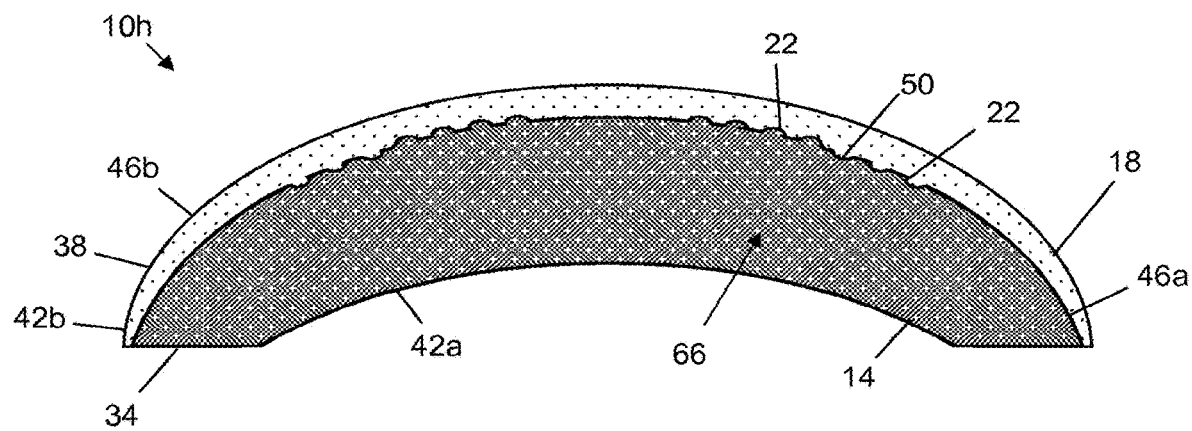
FIG. 11 is a sectional view of an eighth embodiment of the present optical articles in which some of the optical elements are convex and some of the optical elements are concave.

While each of optical articles 10a-10f, as shown, only has convex optical elements 22, other embodiments can have concave optical elements. For example, referring to FIG. 10, optical article 10g can be substantially similar to optical article 10a, the primary exception being that optical article 10g comprises concave optical elements 22 (e.g., that each have a concave optical element surface 50), and, optionally, inner surface 14 can be convex and outer surface 18 can be concave. Optical article 10g can provide a negative addition value to, for example, control hyperopia, and its lens 34 can be formed, for example, in a first mold, e.g., 70, having a molding surface with convex protrusions, e.g., 86. Referring to FIG. 11, optical article 10h can be substantially similar to optical article 10a, the primary exception being that some of optical elements 22 of optical article 10a are convex (e.g., have a convex optical element surface 50) and some of the optical elements are concave (e.g., have a concave optical element surface). Optical article 10h can be suitable to control, e.g., astigmatism, and its lens 34 can be formed, for example, in a first mold, e.g., 70, having a molding surface with both convex protrusions and concave recesses, e.g., 86.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An optical article comprising:
a lens having opposing first and second lens surfaces; and
a protective layer having opposing first and second protective surfaces, the first protective surface disposed on the second lens surface,
wherein the lens includes a plurality of microlenses, each of the plurality of microlenses being an integral part of the lens such that it defines a portion of the second lens surface, and
wherein a maximum thickness of the protective layer is larger than a maximum height of each of the plurality of microlenses such that the plurality of microlenses are encapsulated between the second protective surface and the first lens surface.

2. The optical article of claim 1, wherein the maximum thickness is measured in a direction perpendicular to the first protective surface between the first and second protective surfaces, and the maximum height is measured in a direction perpendicular to the first protective surface.

3. The optical article of claim 1, wherein each of the plurality of microlenses has a maximum height, measured in a direction perpendicular to the first protective surface, that is less than or equal to 0.1 millimeters (mm) and a diameter that is less than or equal to 2.0 mm.

4. The optical article of claim 1, wherein the microlenses have a maximum height, measured in a direction perpendicular to the first protective surface, that is 5-30 µm and a diameter that is 1.0-2.0 mm.

5. The optical article of claim 1, wherein the plurality of microlenses comprise a first material.

6. The optical article of claim 5, wherein the first material has a first index of refraction ranged 1.63-1.71, and the maximum thickness of the protective layer is ranged 0.5-1.2 mm.

7. The optical article of claim 1, wherein the plurality of microlenses are positioned outside a center portion of the optical article such that the center portion of the optical article includes a prescription portion of the optical article.

8. The optical article of claim 7, wherein the plurality of microlenses are positioned inside an outer portion of the optical article such that the outer portion of the optical article includes the prescription portion of the optical article.

9. The optical article of claim 1, wherein the plurality of microlenses are defined within a first area on the second lens surface, and one or more second areas having no convex microlenses and surrounded by the first area and/or at a periphery of optical article.

10. An optical article comprising:
a lens having opposing first and second lens surfaces;
a protective layer having opposing first and second protective surfaces, the first protective surface disposed on the second lens surface; and
a plurality of microlenses, each of the plurality of microlenses defining a portion of one of the first protective surface and the second lens surface,
wherein a maximum thickness of the protective layer is larger than a maximum height of each of the plurality of microlenses such that the plurality of microlenses are encapsulated between the second protective surface and the first lens surface, and
wherein the microlenses are comprised in the lens such that each of the microlenses defines a portion of the second lens surface.

11. The optical article of claim 10, wherein the microlenses have a maximum height, measured in a direction perpendicular to the first protective surface, that is 5-30 μm and a diameter that is 1.0-2.0 mm.

12. The optical article of claim 10, wherein the plurality of microlenses comprise a first material.

13. The optical article of claim 12, wherein the first material has a first index of refraction ranged 1.63-1.71, and the maximum thickness of the protective layer is ranged 0.5-1.2 mm.

14. A method of forming an optical article, the method comprising:
moving first and second primary mold portions of a first mold from an open position to a closed position in which the primary mold portions cooperate to define a first mold cavity, each of the primary mold portions defining a molding surface;
introducing a first moldable material into the first mold cavity;
setting the first moldable material to form a first optical member having opposing first and second optical surfaces, wherein the molding surface of the second primary mold portion defines a plurality of optical elements,
coupling a second optical member to the second optical surface, the second optical member having a maximum thickness, measured in a direction perpendicular to the second optical surface between first and second surfaces of the second optical member, that is larger than the maximum height of each of the optical elements such that the optical elements are encapsulated within a volume defined between the second surface of the second optical member and the first optical surface.

15. The method of claim 14, wherein the coupling comprises:
placing the first optical member on a second mold comprising first and second secondary mold portions such that the first optical surface is disposed on a molding surface of the first secondary mold portion;
after the placing, moving the secondary mold portions from an open position to a closed position in which the secondary mold portions cooperate to define a second mold cavity that is larger than the first optical member such that a volume is defined between the second optical surface and a molding surface of the second secondary mold portion;
introducing a second moldable material into the volume; and
setting the second moldable material to form the second optical member such that the second optical member is coupled to the first optical member and encapsulates the optical elements.

16. The method of claim 15, comprising:
placing the first and second optical members on a third mold comprising first and second tertiary mold portions such that the first optical surface is disposed on a molding surface of the first tertiary mold portion;
after the placing, moving the tertiary mold portions from an open position to a closed position in which the tertiary mold portions cooperate to define a third mold cavity, wherein the third mold cavity is larger than the first and second optical members such that a volume is defined between the second surface of the second optical member and a molding surface of the second tertiary mold portion;
introducing a third moldable material into the volume; and
setting the third moldable material to form a third optical member that is coupled to and disposed on the second surface of the second optical member;
wherein the third moldable material is the same as the first moldable material.

17. The method of claim 15, wherein:
the molding surface of the first primary mold portion is convex such that the first optical surface is concave; and
the molding surface of the second primary mold portion:
is concave such that the second optical surface is convex; and
defines a plurality of concave recesses such that each of the optical elements is convex.

18. The method of claim 17, comprising, before placing the first optical member on the second mold, bending and thereby inverting the first optical member such that the first optical surface is convex and the second optical surface is concave.

19. The method of claim 17, wherein the first moldable material has a first index of refraction and the second moldable material has a second index of refraction lower than the first index of refraction.

20. The method of claim 14, wherein the coupling comprises applying one or more coatings to the second optical surface such that the coating(s) define the second optical member, at least one of the coating(s) comprising a polyurethane coating, a scratch-resistant coating, an antireflective coating, a photochromic coating, an anti-smudge coating, an anti-fog coating, a tintable coating, a self-healing coating, an anti-rain coating, an anti-static coating, an anti-UV coating, or an anti-blue light coating.

* * * * *